United States Patent
Sevindik et al.

(10) Patent No.: US 11,483,203 B2
(45) Date of Patent: Oct. 25, 2022

(54) METHODS AND APPARATUS FOR ENHANCING SCHEDULER FAIRNESS IN SMALL-CELL WIRELESS SYSTEMS

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/083,144

(22) Filed: Oct. 28, 2020

(65) Prior Publication Data

US 2022/0131747 A1   Apr. 28, 2022

(51) Int. Cl.
| | |
|---|---|
| *H04L 41/0816* | (2022.01) |
| *H04W 28/02* | (2009.01) |
| *H04L 1/08* | (2006.01) |
| *H04L 1/00* | (2006.01) |
| *H04W 72/12* | (2009.01) |

(52) U.S. Cl.
CPC ........ *H04L 41/0816* (2013.01); *H04L 1/0009* (2013.01); *H04L 1/08* (2013.01); *H04W 28/0268* (2013.01); *H04W 72/1242* (2013.01)

(58) Field of Classification Search
None
See application file for complete search history.

(56) References Cited

U.S. PATENT DOCUMENTS

| | | | | |
|---|---|---|---|---|
| 2006/0285522 A1* | 12/2006 | Kim | ................. | H04W 72/1231 370/331 |
| 2008/0225742 A1* | 9/2008 | Cho | ....................... | H04L 47/10 370/252 |

(Continued)

FOREIGN PATENT DOCUMENTS

WO    WO-2021014197 A1 *  1/2021

OTHER PUBLICATIONS

Deering., et al., "Internet Protocol, Version 6 (Ipv6) Specification, IETF RFC 2460," Dec. 1998, 39 pages.

(Continued)

*Primary Examiner* — Anh Vu H Ly
(74) *Attorney, Agent, or Firm* — Patent Beach PC

(57) ABSTRACT

Methods and apparatus for enhancing packet scheduler fairness in a small-cell wireless communication network. In one embodiment, the methods and apparatus utilize "quasi-licensed" CBRS (Citizens Broadband Radio Service) wireless spectrum in conjunction with 3GPP wireless communication network (e.g. 4G LTE or 5GNR) for the delivery of services to a number of enhanced CPE (consumer premises equipment), such as fixed wireless apparatus (FWAe). The various FWAe report Channel Quality Indicator (CQI) data to their respective serving base stations over time, and each base station both builds a statistical characterization of each FWAe, and maps the CQI data to a prescribed configuration (e.g., to the Modulation and Coding Scheme (MCS)) adaptively for the transmission of the data to the FWAe, and development of a scheduler priority for each FWAe. In one implementation, once the CQI values are stable for a given FWAe, CQI reporting is terminated for a period of time.

20 Claims, 21 Drawing Sheets

(56) References Cited

U.S. PATENT DOCUMENTS

| | | | |
|---|---|---|---|
| 2009/0201861 A1* | 8/2009 | Kotecha | H04L 25/03343 |
| | | | 370/329 |
| 2011/0047287 A1* | 2/2011 | Harrang | H04L 45/124 |
| | | | 713/340 |
| 2016/0323912 A1 | 11/2016 | Nakamura et al. | |
| 2017/0373789 A1* | 12/2017 | Huang | H04B 7/0452 |
| 2018/0248646 A1 | 8/2018 | Wikstrom et al. | |
| 2018/0352473 A1* | 12/2018 | Gunasekara | H04W 28/04 |
| 2019/0037418 A1* | 1/2019 | Gunasekara | H04B 17/309 |
| 2019/0280763 A1 | 9/2019 | Smyth et al. | |
| 2019/0373301 A1* | 12/2019 | Gunasekara | H04N 21/252 |
| 2020/0169962 A1* | 5/2020 | Fakoorian | H04L 1/1858 |
| 2021/0143885 A1 | 5/2021 | Grobmann et al. | |
| 2022/0140939 A1 | 5/2022 | Sevindik | |
| 2022/0141844 A1 | 5/2022 | Sevindik | |

OTHER PUBLICATIONS

"Evolved Universal Terrestrial Radio Access (E-UTRA); Physical layer procedures," 3GPP Technical Specification 36.213 v16.1.0, Apr. 2020.
IEEE Std. 802.11 or related standards including 802.11a/b/g/n/s/v/ac/ad/ax/ay/ba/be or 802.11-2012/2013, 802.11-2016.
"Internet Protocol DARPA Internet Program Protocol Specification", IETF RCF 791 (Sep. 1981), 50 pages.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
Wi-Fi Direct, "Wi-Fi Peer-to-Peer (P2P) Specification," Wi-Fi Alliance, Version 1.5, 2014, 183 pages.

* cited by examiner

| E-UTRA Operating Band | Uplink (UL) operating band BS receive UE transmit $F_{UL\_low} - F_{UL\_high}$ | | | Downlink (DL) operating band BS transmit UE receive $F_{DL\_low} - F_{DL\_high}$ | | | Duplex Mode |
|---|---|---|---|---|---|---|---|
| 2 | 1850 MHz | – | 1910 MHz | 1930 MHz | – | 1990 MHz | FDD |
| 4 | 1710 MHz | – | 1755 MHz | 2110 MHz | – | 2155 MHz | FDD |
| 5 | 824 MHz | – | 849 MHz | 869 MHz | – | 894 MHz | FDD |
| 7 | 2500 MHz | – | 2570 MHz | 2620 MHz | – | 2690 MHz | FDD |
| 10 | 1710 MHz | – | 1770 MHz | 2110 MHz | – | 2170 MHz | FDD |
| 12 | 699 MHz | – | 716 MHz | 729 MHz | – | 746 MHz | FDD |
| 13 | 777 MHz | – | 787 MHz | 746 MHz | – | 756 MHz | FDD |
| 14 | 788 MHz | – | 798 MHz | 758 MHz | – | 768 MHz | FDD |
| 17 | 704 MHz | – | 716 MHz | 734 MHz | – | 746 MHz | FDD |
| 18 | 815 MHz | – | 830 MHz | 860 MHz | – | 875 MHz | FDD |
| 19 | 830 MHz | – | 845 MHz | 875 MHz | – | 890 MHz | FDD |
| 23 | 2000 MHz | – | 2020 MHz | 2180 MHz | – | 2200 MHz | FDD |
| 25 | 1850 MHz | – | 1915 MHz | 1930 MHz | – | 1995 MHz | FDD |
| 26 | 814 MHz | – | 849 MHz | 859 MHz | – | 894 MHz | FDD |
| 29 | N/A | | | 717 MHz | – | 728 MHz | FDD |
| 30 | 2305 MHz | – | 2315 MHz | 2350 MHz | – | 2360 MHz | FDD |
| 35 | 1850 MHz | – | 1910 MHz | 1850 MHz | – | 1910 MHz | TDD |
| 36 | 1930 MHz | – | 1990 MHz | 1930 MHz | – | 1990 MHz | TDD |
| 38 | 2570 MHz | – | 2620 MHz | 2570 MHz | – | 2620 MHz | TDD |
| 40 | 2300 MHz | – | 2400 MHz | 2300 MHz | – | 2400 MHz | TDD |
| 41 | 2496 MHz | | 2690 MHz | 2496 MHz | | 2690 MHz | TDD |
| 42 | 3400 MHz | – | 3600 MHz | 3400 MHz | – | 3600 MHz | TDD |
| 43 | 3600 MHz | – | 3800 MHz | 3600 MHz | – | 3800 MHz | TDD |
| 46 | 5150 MHz | – | 5925 MHz | 5150 MHz | – | 5925 MHz | TDD |
| 66 | 1710 MHz | – | 1780 MHz | 2110 MHz | – | 2200 MHz | FDD |
| 70 | 1695 MHz | – | 1710 MHz | 1995 MHz | – | 2020 MHz | FDD |

FIG. 5B (Prior art)

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 6 (Prior Art)

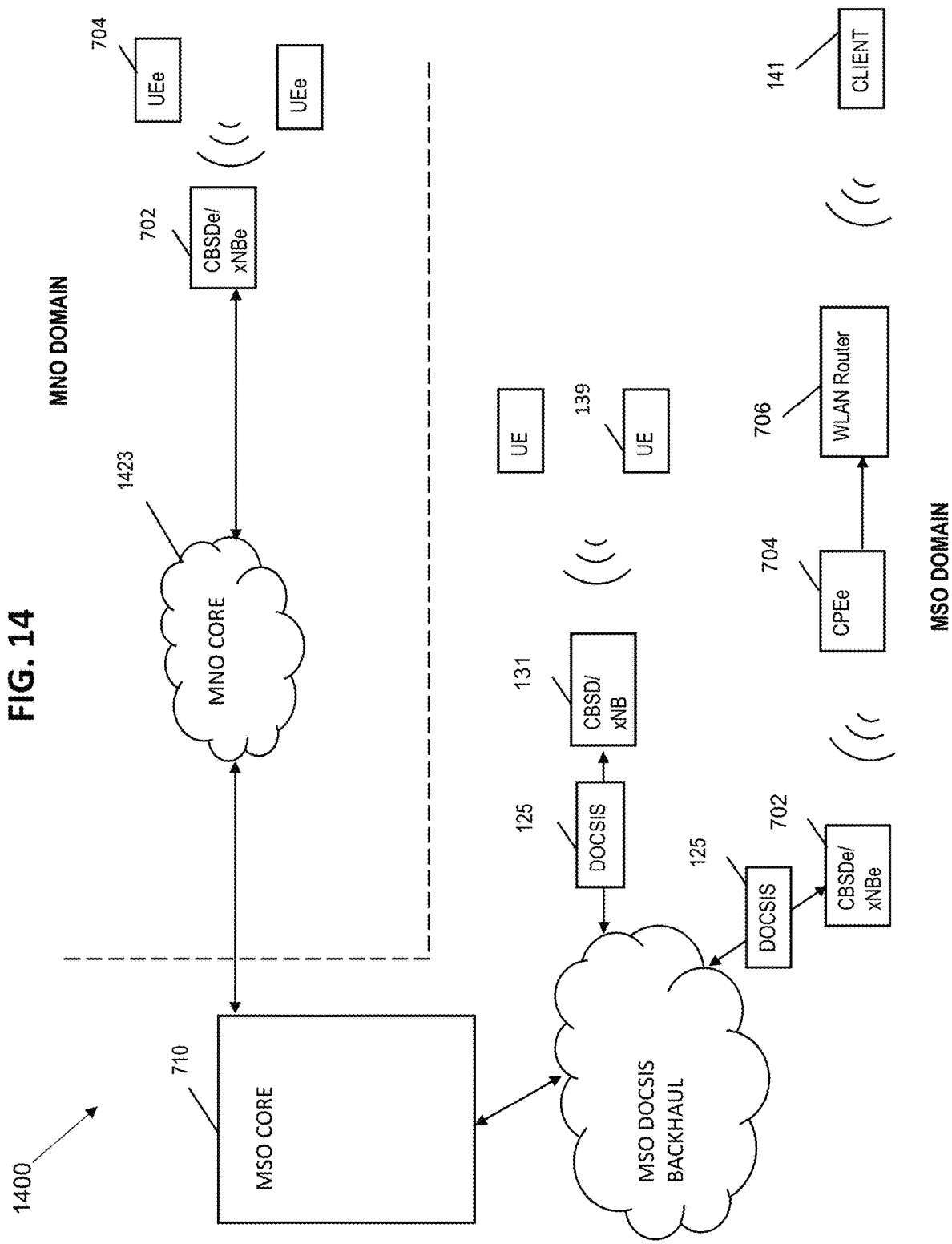

METHODS AND APPARATUS FOR ENHANCING SCHEDULER FAIRNESS IN SMALL-CELL WIRELESS SYSTEMS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for ensuring fairness in resource scheduling for different user devices served by a wireless node, such as for example those providing connectivity via technologies such as Citizens Broadband Radio Service (CBRS), LSA (Licensed Shared Access), TVWS, or Dynamic Spectrum Allocation (DSA).

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Similarly, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized unlicensed "small cell" (e.g., 3GPP "femtocell") coverage via a service provider such as a terrestrial fiber or cable MSO. These small cells can leverage e.g., 3GPP unlicensed bands (such as NR-U bands in the 5 GHz range) or other spectrum such as CBRS (3.550-3.70 GHz, 3GPP Band 48), and C-Bands (3.30-5.00 GHz). Technologies for use of other bands such as 6 GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., 3GPP NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs) for their enterprise and residential customers in order to provide wireless coverage and backhaul, whether in high-density urban applications, suburban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

Managed Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users via a variety of different end-user configurations.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, wireless small cells, etc. The nodes 113 convert the optical domain signals to RF signals typically in the range of 42-750 MHz for downstream transmission, and likewise convert RF domain signals to optical for upstream data in the range of 0-42 MHz. Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.

In a typical HFC network headend 102 (see FIG. 1A), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components, including upstream and downstream transceivers, MAC schedulers, QoS functions, security/access authentication, etc. See FIG. 1B, wherein multiple different CBSD/xNB devices 131 serving heterogeneous types of users/clients are backhauled to a common CMTS.

Another key component in the headend 102, is the Edge QAM modulator (EQAM) 105. The EQAM receives e.g., an IP unicast or multicast MPEG transport stream packet over a GigE (Gigabit Ethernet) interface, and produces transport stream on one or more RF channels for transmission over the HFC distribution network 121. The EQAM can also perform other functions such as re-stamp of Program Clock Reference (PCR) timestamps such as for de-jitter processing. Output from the EQAM 105 is combined with video signals (e.g., SDV, analog, etc.) for downstream transmission by the combiner logic 107.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 202, (ii) Priority Access tier 204, and (iii) General Authorized Access tier 206. See FIG. 2. The three tiers are coordinated through one or more dynamic Spectrum Access Systems (SAS) 302 as shown in FIG. 3 (including e.g., Band 48 therein).

Incumbent Access (existing DOD and satellite) users 202 include authorized federal and grandfathered Fixed Satellite Service (FSS) users currently operating in the 3.5 GHz band shown in FIG. 2. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 204 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 206 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels.

The FCC's three-tiered spectrum sharing architecture of FIG. 2 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 131 (see FIG. 3) can only operate under authority of a centralized Spectrum Access System (SAS) 302. Rules are optimized for small-cell use, but also accommodate point-to-point and point-to-multipoint, especially in rural areas.

Under the FCC system, the standard SAS 302 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 3, these functions are provided for by, inter alia, an incumbent detection (i.e., environmental sensing) function 307 configured to detect use by incumbents, and an incumbent information function 309 configured to inform the incumbent when use by another user occurs. An FCC database 311 is also provided, such as for PAL license validation, CBSD registration, and other functions.

An optional Domain Proxy (DP) 308 is also provided for in the FCC architecture. Each DP 308 includes: (1) SAS interface GW including security; (2) directive translation between CBSD 131 and domain commands; (3) bulk CBSD directive processing; and (4) interference contribution reporting to the SAS.

A domain is defined is any collection of CBSDs 131 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 308 can aggregate control information flows to other SAS, such as e.g., a Commercial SAS (CSAS, not shown), and generate performance reports, channel requests, heartbeats, etc.

CBSDs 131 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only.

Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

FIG. 4 illustrates a typical prior art CBRS-based CPE (consumer premises equipment)/FWA architecture 400 for a served premises (e.g., user residence), wherein the CPE/FWA 403 is backhauled by a base station (e.g., eNB or gNB) 131, the latter which is backhauled by the DOCSIS network shown in FIG. 1A. A PoE (Power over Ethernet) injector system 404 is used to power the CPE/FWA 403 as well as provide Ethernet (packet connectivity for the CPE/FWA radio head to the home router 405).

Additionally, new wireless systems and small cells are being fielded, including in new frequency bands which may be licensed, unlicensed, or allocated under a shared model similar to that used for CBRS (see e.g., FIG. 5A, illustrating new Band 71 with the 600 MHz region, and FIG. 5B showing e.g., Bands 12-17 in the 700 MHz region).

Unaddressed Issues of Data Traffic Scheduling—

In the existing deployment model of a wireless network system such as the small-cell based CBRS system referenced above, a packet scheduler of a base station can schedule data to the various UE it serves at fixed time intervals. For example, the packet scheduler can determine, every 120 milliseconds, which UE will receive data via which radio frequency (RF) channel, etc. The typical packet scheduler takes into account various metrics such as channel quality, traffic type, and quality of service (QoS) class for its determination.

In exemplary 3GPP technology, the Channel Quality Indicator (CQI), as defined in 3GPP TS 36.213, entitled "Evolved Universal Terrestrial Radio Access (E-UTRA); Physical layer procedures", v16.1.0, dated April 2020, which is incorporated herein by reference in its entirety, indicates Downlink (DL) RF channel quality measured by a UE. The CQI value ranges from 0-15, as specified in 3GPP TS 36.213 (See FIG. 6 herein, derived from TS 36.213 Table 7.3.2-1).

In a cellular wireless system (e.g., 4G LTE/5G), the RF channel between a given base station and UE varies in a very short period due to UE mobility, and MCS needs to be changed rapidly in some cases according to the channel variations. The UE measures Reference Signal Received Power (RSRP), maps the RSRP to Signal-to-Interference-Noise-Ratio (SINR) with a predefined formula, calculates CQI value from a lookup table that shows the relation between SINR and CQI, and reports the calculated CQI to the base station. Consequently, the base station maps the received CQI value to an MCS from a pre-defined lookup table (e.g., FIG. 6) specified in TS 36.213, and adjust its DL MCS according to the mapped value from the table.

In a prior art FWA system, as shown in the architecture 400 of FIG. 4, the CPE 403 is located at a fixed location, and hence the RF channel characteristics between CBSD and CPE do not vary significantly in short duration, which causes the FWA RF channel to be static. FWA devices—often installed in, e.g., rural areas and remaining static after installation—may not experience much variation in the observed communication channel quality due to, e.g., the surrounding environment (including, e.g., buildings and other structure that may potentially affect the communication channel quality experienced by the FWA) and the exterior portions of FWA itself (e.g., antenna elements) remaining static. In this scenario, the packet scheduler performance may be impacted negatively, based at least on the lack of diversity in resource assignment (resulting from the little to no variation in the reported CQIs). Such schedulers generally are optimized for constantly (more rapidly) changing CQI and channel conditions, and allocation of resources based on this dynamically changing environment.

Conversely, once a given CQI value is transmitted from a particular FWA based on its particular RF environment, such CQI value will rarely change, and as a result the decision metrics used by the "dynamic" scheduler based on reported CQI would likely remain static. The scheduler in effect "settles into" given CQI values/patterns of allocation of resources for each different CPE, and these patterns may persist for extended periods of time due to the lack of any change in CQI reported by the CPE (e.g. periodically). Consequently, the priority for downstream (DS) transmission of data assigned to such FWA, as well as the assigned MCS, may rarely change.

Furthermore, this means if a particular FWA is located (physically) nearer to a base station (e.g., CBSD/xNB) than other FWA being served by that base station, such closer FWA will likely always have the higher priority in the DS data transmission from the base station because of its presumptively higher channel quality (since channel quality and hence CQI is generally a function of RF path loss). Conversely, the farther away an FWA is from the base station, the more degradation in channel quality that the FWA may suffer due to, e.g., path loss, interfering RF sources, etc., and as such farther-away FWA may be prejudiced in terms of priority. This situation may lead to instances where some customers using their FWA as wireless backhaul for their premises devices (e.g., wireless routers, femtocells, PCs, etc.) experience a very good quality of service generally all the time, and others experience comparatively poor service consistently, and such poor service which may even fall below SLA (service level agreement) minimums. Stated differently, the essentially random nature of a given customer's premises location relative to a serving base station may dictate their priority within the scheduler and hence in some regards their level of service. This obviously can lead to loss of customer experience when using the service via one of the lower priority FWA, and adversely affect the perception of quality of the service provider by customers.

Moreover, running a scheduler in the base station/CBSD is costly in terms of hardware and software resources. At each TTI (transmission time interval, such as e.g., 1 msec.), the typical scheduler collects all CQI values from all CPE in the network, and distributes the available resource of that CBSD among the CPE in the network. Hence, the CBSD scheduler must wait for all CQI values from the various CPE to be sent and to be made available. Of those CQI values received by the scheduler, many may not be accurate/representative of the actual channel as well. Hence, such existing schedulers gather "snapshot" data repetitively and with high overhead, and make scheduling decisions based only on each snapshot.

Hence, improved methods and apparatus are needed to, e.g., diversify the scheduling of the data transmissions (particularly in the DL) for a plurality of FWA with largely static surrounding RF conditions, so as to improve the "fairness" of the data transaction with each FWA from a given base station in a network. Such a solution would ideally result in more equal allocation of available backhaul bandwidth across multiple FWA in a manner more decoupled from their particular channel conditions, and accordingly create higher quality of experience for consumers of the data services.

SUMMARY

The present disclosure addresses the foregoing needs by providing, inter alia, methods and apparatus for optimizing operation (e.g., providing enhanced scheduler fairness) for, inter alia, served CPE such as FWA devices within a wireless network.

In a first aspect of the disclosure, a computerized method of data traffic management in a wireless network having a plurality of wireless premises devices in wireless communication with a base station is described. In one embodiment, the computerized method includes: receiving at the base station of the wireless network first data related to respective ones of radio frequency (RF) channels between the base station and the plurality of wireless premises devices; evaluating the received first data to generate respective characterizations of the RF channels; based at least in part on the respective characterizations, adjusting a configuration of at least one of the wireless premises devices; and determining a schedule of data delivery to the wireless premises devices based at least on the characterizations and the adjusted configuration.

In one variant, the receiving of the first data includes receiving a Channel Quality Indicator (CQI) generated by respective ones of the wireless premises devices.

In another variant, the evaluating the received first data to generate respective characterizations includes: calculating a respective standard deviation of a plurality of Channel Quality Indicator (CQI) values received from each of the plurality of wireless premises devices over a period of time; and evaluating at least the standard deviation associated with the at least one wireless premises device against a prescribed channel stability criterion. In one implementation thereof, the determining a schedule includes increasing a priority level associated with the data delivery to the at least one wireless premises device relative to other priority levels associated with data delivery to respective ones of other of the plurality of wireless premises devices.

In another variant of the method, the adjusting of the configuration includes adjusting at least one of (i) a Modulation and Coding Scheme (MCS) value, or (ii) a transport block size (TBS) related to the at least one wireless premises device. In one implementation, the adjusting the at least one of (i) MCS value or (ii) TBS size includes: increasing the MCS value by a first amount; transmitting data to the at least one wireless premises device using the increased MCS value; determining that data representative of a retransmission request for the transmitted data is received from the at least one wireless premises device; and based at least on the determining that the data representative of the retransmission request is received, decreasing the MCS value by a second amount.

In another implementation, the at least one of (i) MCS value or (ii) TBS size includes: increasing the MCS value by a first amount; transmitting data to the at least one wireless premises device using the increased MCS value; determining that data representative of a retransmission request for the transmitted data is not received from the at least one wireless premises device for a prescribed duration of time; and based at least on the determining that the data representative of the retransmission request is not received for the prescribed duration of time, increasing the MCS value further.

In a further variant, the method further includes performing, after the determining of the schedule, a Channel Quality Indicator (CQI) randomization process, the CQI randomization process including: generating data relating to a plurality of CQI values associated with a plurality of respective wireless premises devices; sending, to each one of the plurality of wireless premises devices, data representative of a request to stop reporting CQI values associated with the each wireless premises devices; after a prescribed period of time has elapsed since the sending, selecting one or more of the plurality of wireless premises devices via a randomized process; and increasing respective one or more of the plurality of CQI values associated with the one or more of the plurality of wireless premises devices by a prescribed amount in order to perturb the system.

In yet another variant, the base station includes a CBRS (Citizens Broadband Radio Service) CBSD (Citizens Broadband Service Device) compliant with 3GPP (Third Generation Partnership Project) protocols; the respective ones of the RF channels each comprise channels using a CBRS frequency within the band of 3.550 to 3.700 GHz inclusive, the CBRS frequency assigned to the CBSD by a SAS (Spectrum Allocation System); and the user device includes a CBRS fixed wireless apparatus (FWA).

In another aspect of the disclosure, a computerized wireless network apparatus configured for data communication at least with a plurality of fixed wireless Customer Premises Equipment (CPE) via a content delivery network is described. In one embodiment, the computerized wireless network apparatus includes: processor apparatus; a wireless interface in data communication with the processor apparatus and configured for wireless data communication with the plurality of fixed wireless CPE; and storage apparatus in data communication with the processor apparatus, the storage apparatus including at least one computer program. In one variant, the at least one computer program is configured to, when executed by the processor apparatus, cause the computerized wireless network apparatus to: receive first data relating to a wireless channel between one of the plurality of fixed wireless CPE and the computerized wireless network apparatus; process the received first data to determine a priority of the one fixed wireless CPE relative to at least one other of the plurality of fixed wireless CPE; based at least on the processed first data, cause adjustment of a configuration of the wireless interface and a corresponding wireless interface of the one fixed wireless CPE; and based at least in part on the adjusted configuration, determine schedule of data delivery to the plurality of fixed wireless CPE.

In another variant, the receipt of the first data relating to a wireless channel between one of the plurality of fixed wireless CPE and the computerized wireless network apparatus includes receipt of a plurality of CQI data over a prescribed period of time; and the processing of the received first data to determine a priority includes: generation of a statistical distribution using at least the plurality of CQI data; and generation of a representative CQI value based on the statistical distribution.

In one implementation, the generation of a representative CQI value based on the statistical distribution includes determination of at least one of a mean or median value for the statistical distribution; and the adjustment of a configuration of the wireless interface and a corresponding wireless interface of the one fixed wireless CPE is based at least on the mean or median value.

In another variant, the at least one computer program is further configured to, when executed by the processor apparatus, cause the computerized wireless network apparatus to utilize received feedback data sent from the fixed wireless CPE in the adjustment of the configuration of the wireless interface and a corresponding wireless interface of the one fixed wireless CPE. In one implementation thereof, the receiving feedback data from the end-user device relating to the sufficiency of the data transmission includes receiving data relating to a need for retransmission of the data due to a decoding failure by the end-user device.

In another aspect of the disclosure, a fixed wireless apparatus for use in a wireless network is described. In one embodiment, the apparatus includes: at least one wireless interface; processor apparatus in data communication with the at least one wireless interface; and storage apparatus in data communication with the processor apparatus, the storage apparatus including at least one computer program configured to, when executed by the processor apparatus: utilize the at least one wireless interface to measure at least one aspect of a radio frequency (RF) signal transmitted from a base station serving the fixed wireless apparatus; based at least on the measured at least one aspect, determine at least one data value indicative of a quality of a channel carrying the transmitted RF signal; transmit the at least one data value to the base station using the at least one wireless interface; and thereafter: transmit feedback data to the base station using the at least one wireless interface; receive data from the base station instructing the fixed wireless apparatus to suspend further transmission of the at least one data indicative of a quality of a channel to the base station; and based at least on the received data from the base station, cause cessation of the transmission of the at least one data indicative of a quality of the channel until a subsequent occurrence of an event.

In one variant, the base station includes a CBRS (Citizens Broadband Radio Service) CBSD (Citizens Broadband Service Device) compliant with 3GPP (Third Generation Partnership Project) protocols; the UP data is received using a CBRS frequency within the band of 3.550 to 3.700 GHz inclusive, the CBRS frequency assigned to the CBSD by a SAS (Spectrum Allocation System); and the fixed wireless apparatus includes a CBRS fixed wireless apparatus (FWA) disposed at a user premises; and wherein the base station and fixed wireless apparatus are each managed by a common network operator serving the user premises.

In one implementation thereof, the measured at least one aspect of a radio frequency (RF) signal includes a received power measurement; and the determination of the at least one data value indicative of a quality of a channel carrying the transmitted RF signal includes: determination of a quantity relating signal to noise within the RF signal; and using the determined quantity to generate at least one channel quality index value. In another variant, the at least one computer program is further configured to, when executed by the processor apparatus, determine that the channel carrying the transmitted RF signal is substantially invariate over a prescribed period of time. In one implementation, the event includes a subsequent change in at least one of a modulation and coding scheme (MCS) or transport block size (TB S) associated with transmission of user plane (UP) data from the base station to the fixed wireless apparatus using the channel.

In one configuration, the at least one computer program is further configured to, when executed by the processor apparatus, cause transmission of feedback data to the base station using the at least one wireless interface after the subsequent change in the at least one of the MCS or TBS.

In an additional aspect of the disclosure, computer readable apparatus is described. In one embodiment, the apparatus includes a storage medium configured to store one or more computer programs, such as on a fixed wireless receiver of a managed wireless network. In one embodiment, the apparatus includes a program memory or HDD or SSD and stores one or more computer programs supporting scheduler fairness for fixed wireless receivers.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In a further aspect, methods and apparatus for randomizing CQI assignment are disclosed.

In a further aspect, methods and apparatus for determining a need for MCS and/or TBS adjustment are described.

In another aspect, methods and apparatus for determining when to adjust CQI distribution are disclosed.

In a further aspect, methods and apparatus for determining when to stop receiving CQI values from CPE/FWA are disclosed.

In yet another aspect, a database to maintain reported/assigned CQI values is disclosed.

In a further aspect, a scheduler apparatus is disclosed.

In another aspect, a network apparatus for downstream data traffic management is described.

In still a further aspect, a network architecture comprising a base station which includes DS data transmission schedule management logic, a plurality of CPE/FWA apparatus and a plurality of user devices is disclosed.

These and other aspects shall become apparent when considered in light of the disclosure provided herein.

BRIEF DESCRIPTION OF THE DRAWINGS

FIG. 5B is a tabular representation of various E-UTRA RF spectrum bands currently allocated.

FIG. 6 is a tabular representation of exemplary prior art CQI value ranges from 0-15, as specified in 3GPP TS 36.213, Table 7.3.2-1.

FIG. 14 is a block diagram illustrating one embodiment of an MSO/MNO cooperative network architecture utilizing the enhanced CBSD and CPE/FWA apparatus of the present disclosure.

FIGS. 1-5B and 7-14 ©Copyright 2019-2020 Charter Communications Operating, LLC. All rights reserved.

DETAILED DESCRIPTION

Figure 1:
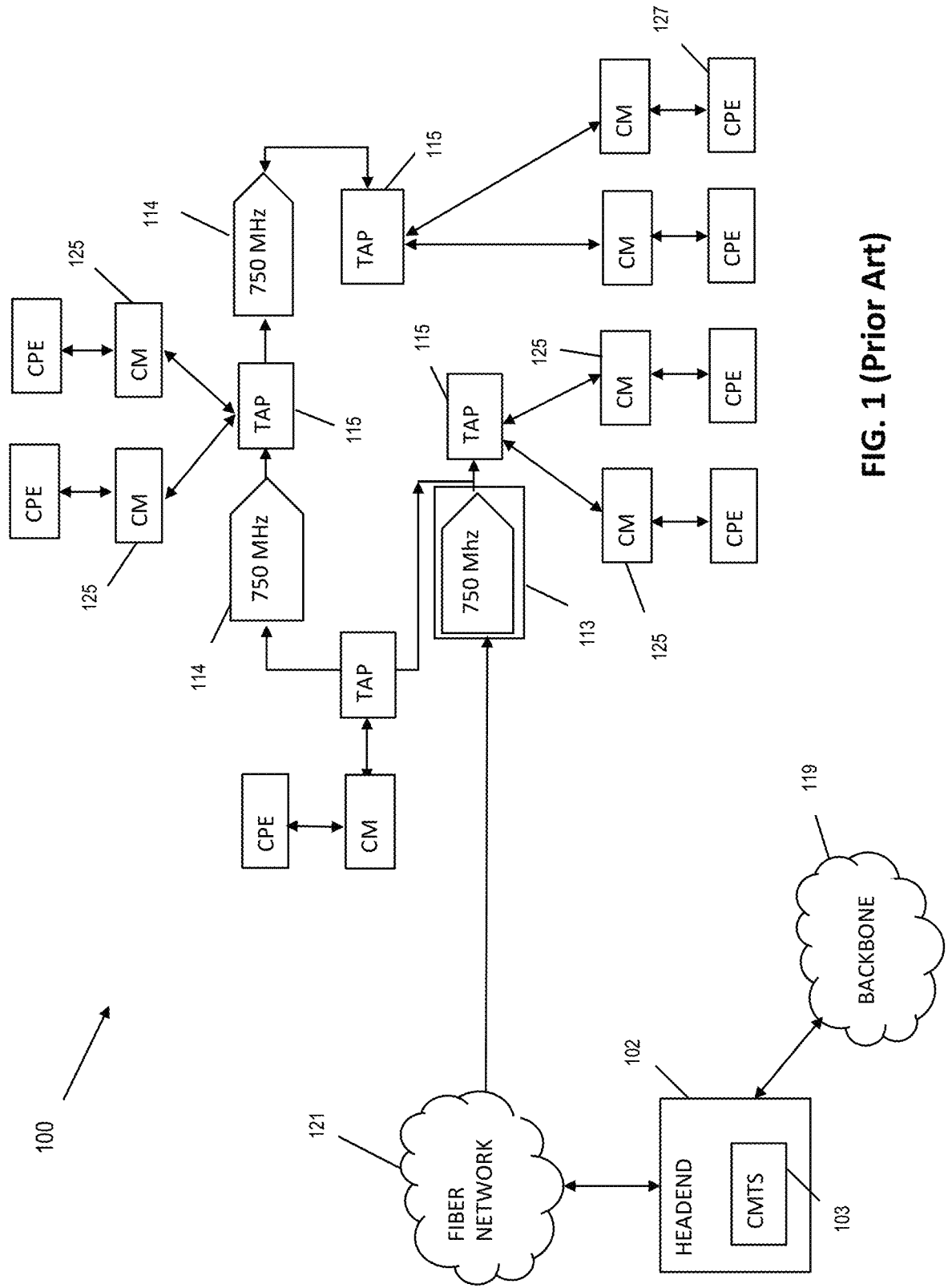
FIG. 1 is a block diagram illustrating a prior art hybrid fiber-coaxial (HFC) data network for delivery of data to end user devices.
Figure 1A:
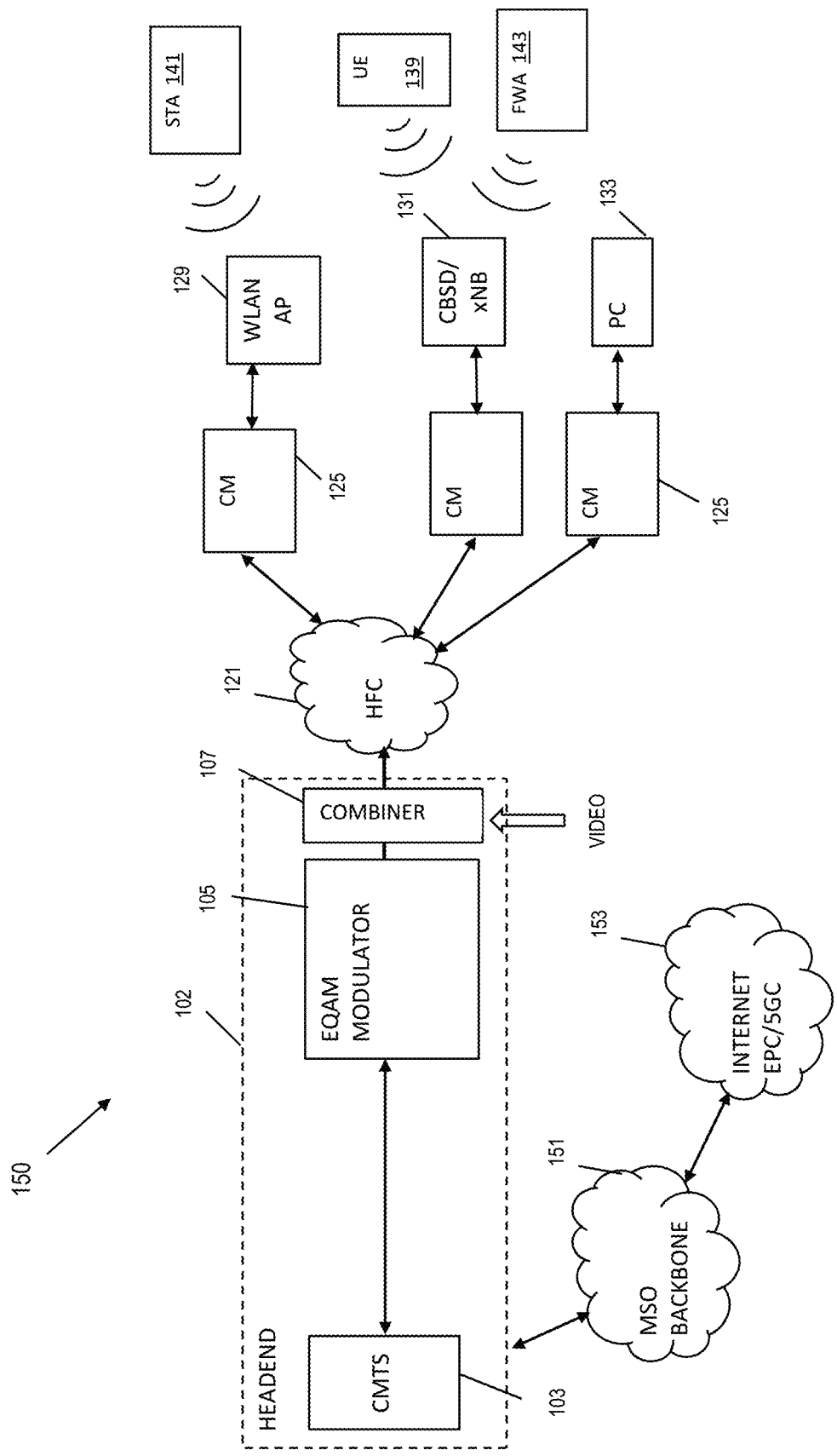
FIG. 1A is a block diagram illustrating the DOCSIS infrastructure of the HFC network of FIG. 1, and various types of backhauled premises devices.
Figure 1B:
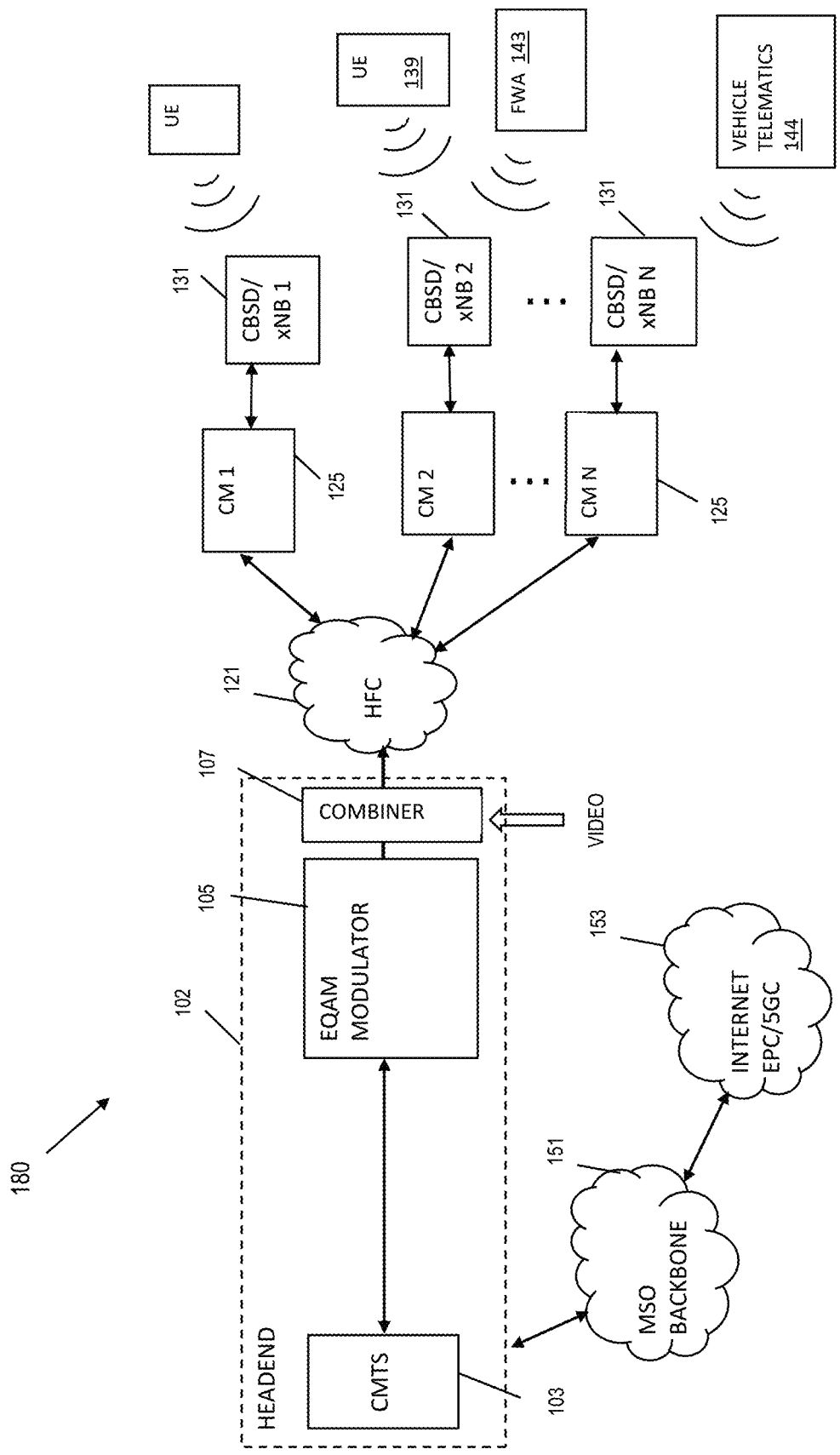
FIG. 1B is a block diagram illustrating the DOCSIS infrastructure of the HFC network of FIG. 1, wherein multiple different CBSD/xNB devices serving heterogeneous types of users/clients are backhauled to a common CMTS.
Figure 2:
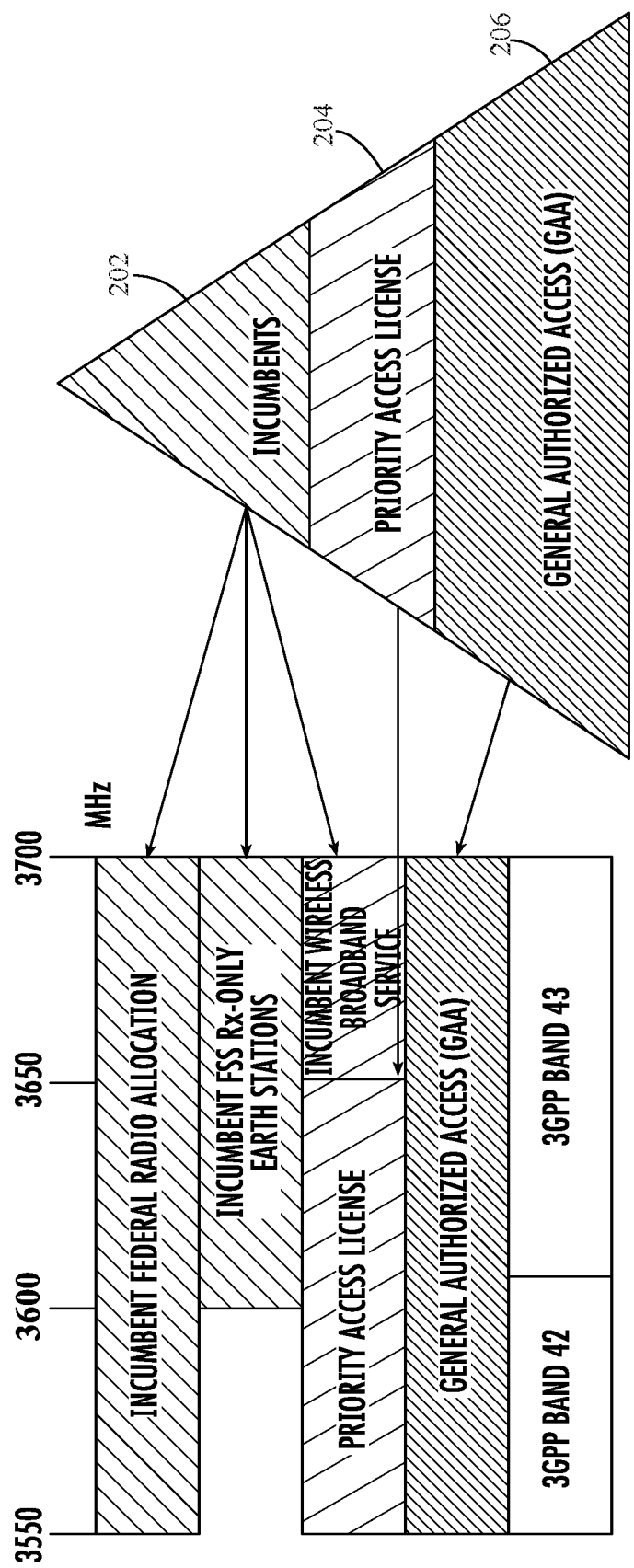
FIG. 2 is a graphical illustration of prior art CBRS (Citizens Broadband Radio Service) users and their relationship to allocated frequency spectrum in the 3.550 to 3.700 GHz band.

Reference is now made to the drawings wherein like numerals refer to like parts throughout.

As used herein, the term "access node" refers generally and without limitation to a network node which enables communication between a user or client device and another entity within a network, such as for example a CBRS CBSD, small cell, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with any of 3GPP Release 15-17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other bands such as e.g., Bands 12-17 and 71.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "wireline" includes electrical and optical transmission media such as, without limitation, coaxial cable, CAT-5/6 cable, and optical fiber.

As used herein, the term "xNB" refers to any 3GPP-compliant node including without limitation eNBs (eU-TRAN) and gNBs (5G NR).

Overview

The present disclosure provides, inter alia, improved methods and apparatus for enhanced data traffic management for a base station serving multiple different user devices within a wireless architecture, such as one using "quasi-licensed" spectrum provided by the recent CBRS technology initiatives. Exemplary embodiments of the base station apparatus and supporting methods described herein can advantageously provide for more fair or equitable allocation of network resources for fixed wireless devices such as CBRS FWA units. In one variant, the behavior of a packet scheduler of the base station is adjusted to provide such fairness through randomization or "perturbation" of what would otherwise be a highly static channel quality reporting regime. The disclosed scheduler also operates so as to characterize each different served FWA in terms of its channel behavior (including statistically over time), and change downstream channel configuration (e.g., MCS values, transport block sizes, operating modes, etc.) so as to attempt to more completely utilize available channel capacity across all of the served FWA devices. In some embodiments, this characterization data can also be used by the base station in place of the traditional/constant CQI reporting by each FWA under extant 3GPP protocols, thereby alleviating each FWA (at least for periods of time) from gathering and reporting CQI data, and the connected base station from receiving and analyzing the data for perhaps hundreds of FWA.

In an exemplary embodiment, a method for determining an appropriate MCS for a FWA based on its reported CQI values is provided. In one variant, the base station calculates a standard deviation of a plurality of CQI values reported from the FWA, and compares it to a threshold value. Based at least on the standard deviation being below the threshold value (indicative of a suitably stable RF environment at least on a statistical basis), the base station adjusts the MCS and/or other configuration parameter(s) in order to determine whether maximum channel capacity has been reached, or other factors such as e.g., an appropriate transport block size to use for the DS data traffic.

The exemplary embodiments of the disclosure solve several salient issues with current CBSD/xNB scheduler operation, including: (i) reduction of the time and resources consumed in scheduling for all users, through creation of one or more CQI distributions for each CPE, so that these values at hand can be used to make better scheduling optimizations, rather than waiting for all CQI values from CPEs to be sent and to be available (or relying on transient data which may or may not be representative/accurate and which may lead to non-optimal scheduling decisions); and (ii) scheduling transiently (e.g., TTI-to-TTI) versus scheduling on a "look ahead" bases for several increments (which leads to better utilization of resources, since each CPE will be scheduled at least some data).

Advantageously, the disclosed methods and apparatus can be utilized in a variety of wireless network topologies, which include, e.g., FWA devices, as well as various types of base stations that support different types of radio access technologies (e.g., 3GPP 4G-LTE/5G-NR). The methods and apparatus described herein may also advantageously be extended to other licensed, non-licensed, or shared-access architectures (i.e., other than CBRS) such as for example DSA, LSA, and TVWS systems.

Detailed Description of Exemplary Embodiments

Exemplary embodiments of the apparatus and methods of the present disclosure are now described in detail. While these exemplary embodiments are described in the context of the previously mentioned base station (e.g., 3GPP eNB or gNB), wireless premises devices using unlicensed or quasi-licensed spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or audio or voice). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols.

Moreover, while some embodiments herein are described in terms of CBRS spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitation DSA, LSA, or TVWS systems, and those above 4.0 GHz (e.g., currently proposed allocations up to 4.2 GHz, and even millimeter wave bands such as those between 24 and 100 GHz), whether licensed, quasi-licensed or unlicensed.

Additionally, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects are generally access technology "agnostic" and hence may be used across different access technologies, and can be applied to, inter alia, any type of P2MP (point-to-multipoint) or MP2P (multipoint-to-point) technology, including e.g., Qualcomm Multefire. Other features and advantages of the present disclosure will immediately be recognized by persons of ordinary skill in the art with reference to the attached drawings and detailed description of exemplary embodiments as given below.

Exemplary Network Architecture—

Figure 7:
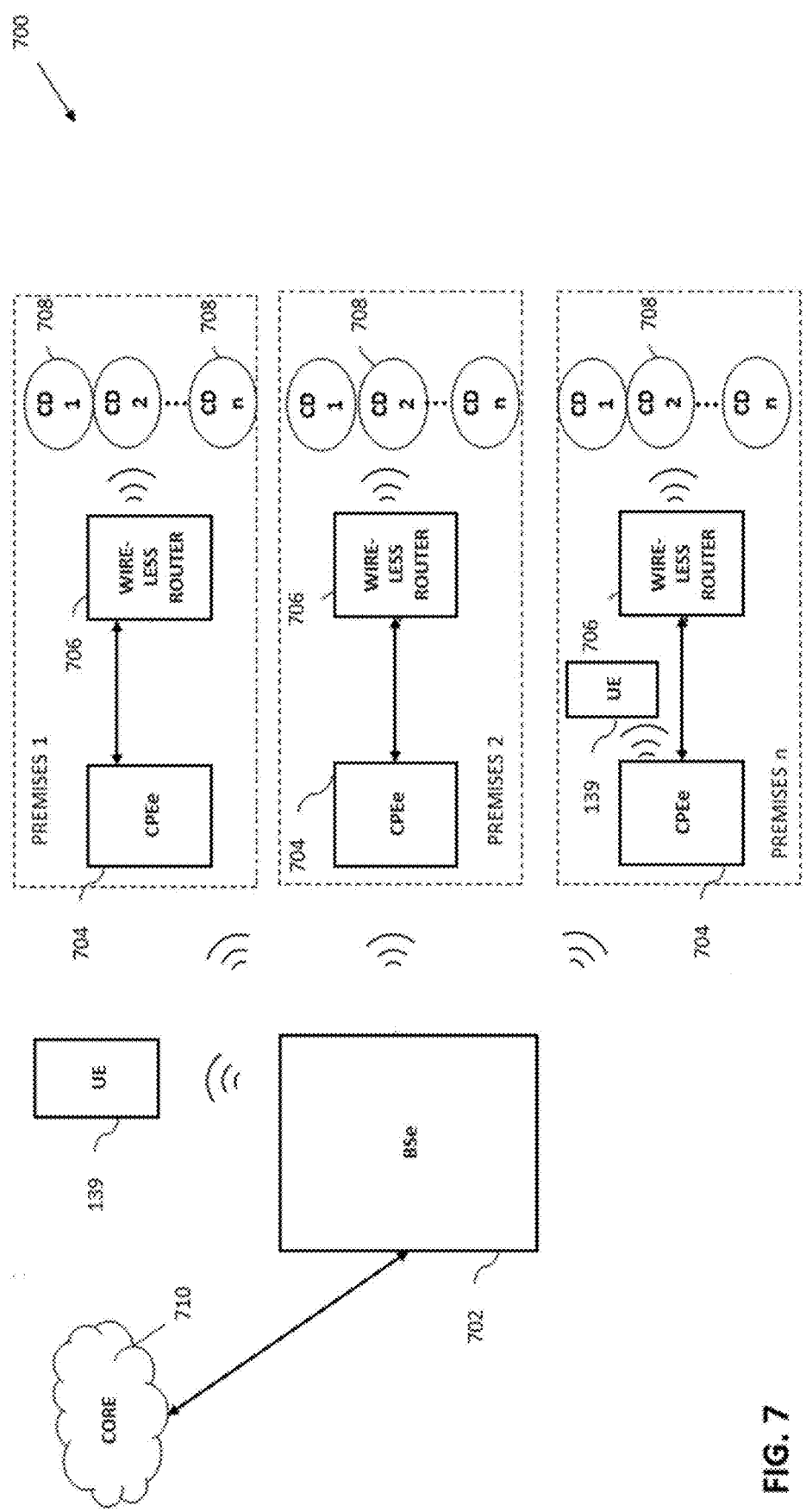
FIG. 7 is a block diagram illustrating one exemplary wireless delivery architecture according to the present disclosure, including enhanced base station (BSe) and enhanced CPE (CPEe).

FIG. 7 is a block diagram illustrating a general network architecture configured for fair packet scheduling and management according to the present disclosure.

As illustrated, the exemplary network architecture 700 includes at least one enhanced base station or BSe 702 (e.g., CBSDe/xNBe) connected to a core network 710, a plurality of CPEe 704 (e.g., FWAe devices), a plurality of respective wireless routers 706, and one or more client devices 708 connected to each wireless router 706. The CPEe may also support (backhaul) other devices such as DSTBs, modems, local small cells or access nodes, and IoT devices, not shown.

Figure 5A:
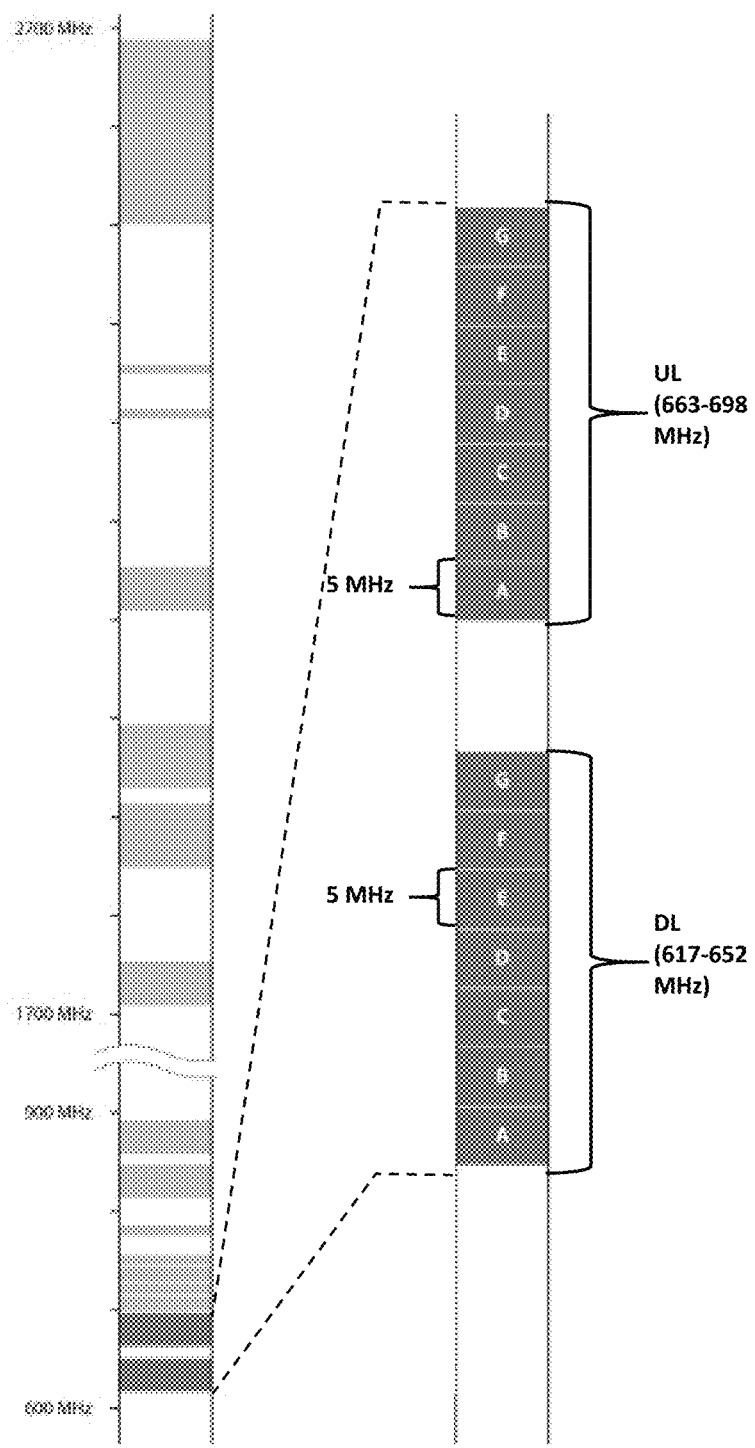
FIG. 5A is a graphical representation of Band 71 radio frequency (RF) spectrum currently allocated for use by the FCC.

In one exemplary embodiment, the BSe 702 is connected wirelessly to each CPEe 704. For example, a radio access technology such as 3GPP 4G-LTE or 5G-NR can be used, in conjunction with the CBRS technology discussed elsewhere herein, to establish the wireless connection between the base station 702 and the CPEe 704. Moreover, as referenced herein, different spectrum (and types of spectrum) can be used consistent with the architecture 700, including e.g., ultra-high bandwidth mmWave as set forth in recent 3GPP 5G NR standards, and/or licensed sub-1 GHz spectrum (see FIGS. 5A and 5B), with CBRS spectrum being merely exemplary.

As illustrated, the BSe 702 may also serve mobile UE 139, or other devices not shown directly (versus service at a served premises by the CPEe or associated small cell, as shown in the diagram of Premises N in FIG. 7).

Figure 9:
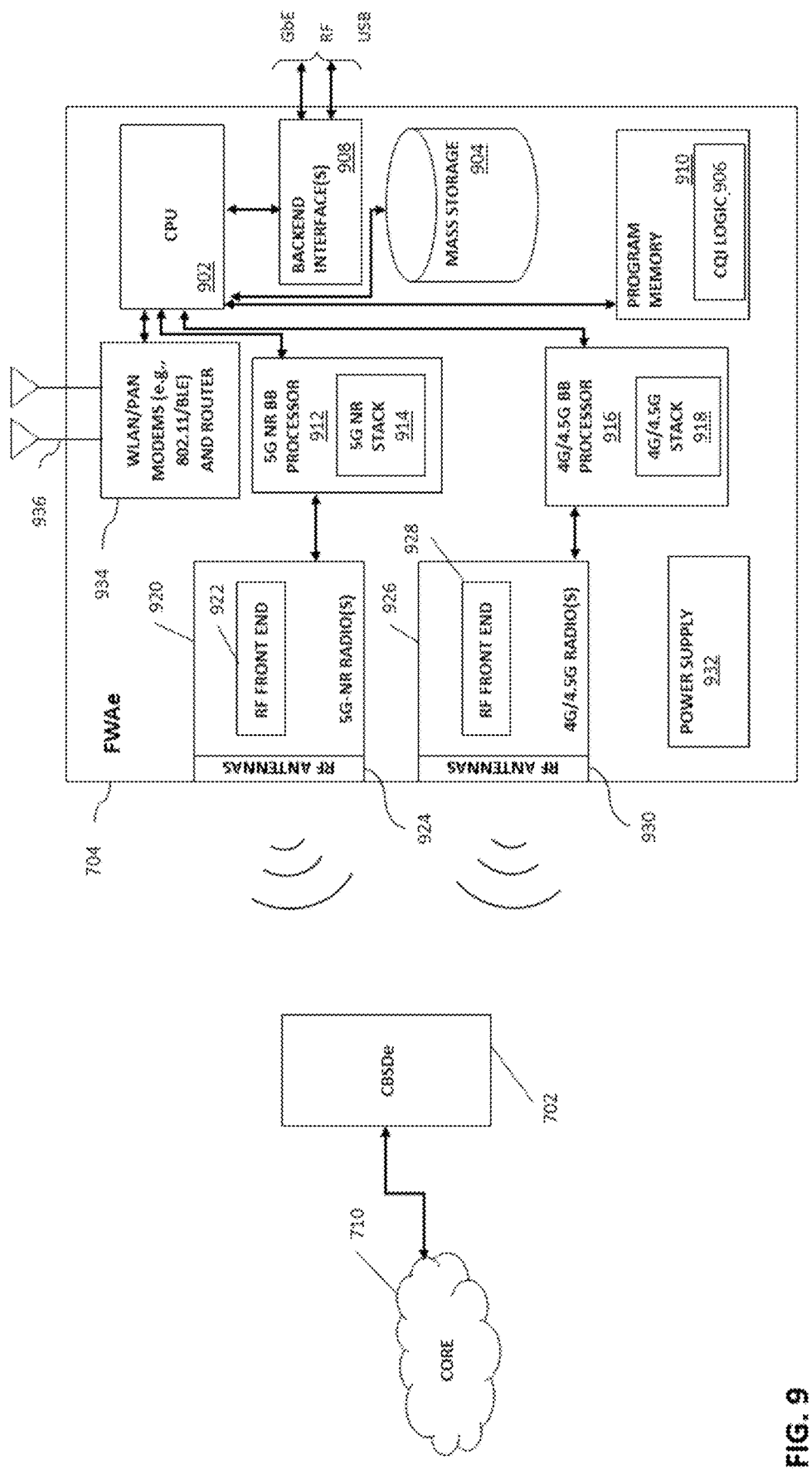
FIG. 9 is a block diagram illustrating an exemplary embodiment of an FWAe apparatus according to the present disclosure.

Each CPEe 704 is connected in the illustrated embodiment via cable such as a CAT-5 cable to a wireless router 706 to provide a local area network (WLAN) service for the connected devices 708. It may also be integrated within e.g., the CPEe 704 as shown in the embodiment of FIG. 9, discussed infra. A connected device 708 can be any device that can connect to the wireless router 706 (e.g., via Wi-Fi connection), to consume any type of data that can be transmitted through it. Examples of the connected devices 708 include but are not limited to a smartphone, tablet, a personal computer (including a laptop), a smart television, or USB-based "stick" appliance. As discussed elsewhere herein, the connected devices 708 can consume various different types of data traffic generated for, e.g., web browsing, VoIP calling, video streaming, etc., including simultaneously based on different applications operative on the client.

In one embodiment, the network components of the architecture 700 are managed by a common network operator (e.g., cable MSO), with the core network 710 comprising a 3GPP EPC or 5GC serving core functions for a plurality of BSe 702 distributed throughout an operating area. The individual served premises may be within urban, suburban, or rural areas in varying densities, such as within an MDU (e.g., apartment building), enterprise campus, or distributed throughout broader areas.

Moreover, while one CPEe 704 is shown serving each premises, the various premises can be aggregated or "ganged" together such that one CPEe serves multiple premises users, such as where a single CPEe serves an apartment building or college dorm, with each individual user account having its own wireless router 706 and other premises client devices with all being backhauled by a single CPEe. This may be the case in e.g., mmWave based installations which have extremely high bandwidth and backhaul capability.

Enhanced Base Station (BSe)—

Figure 8:
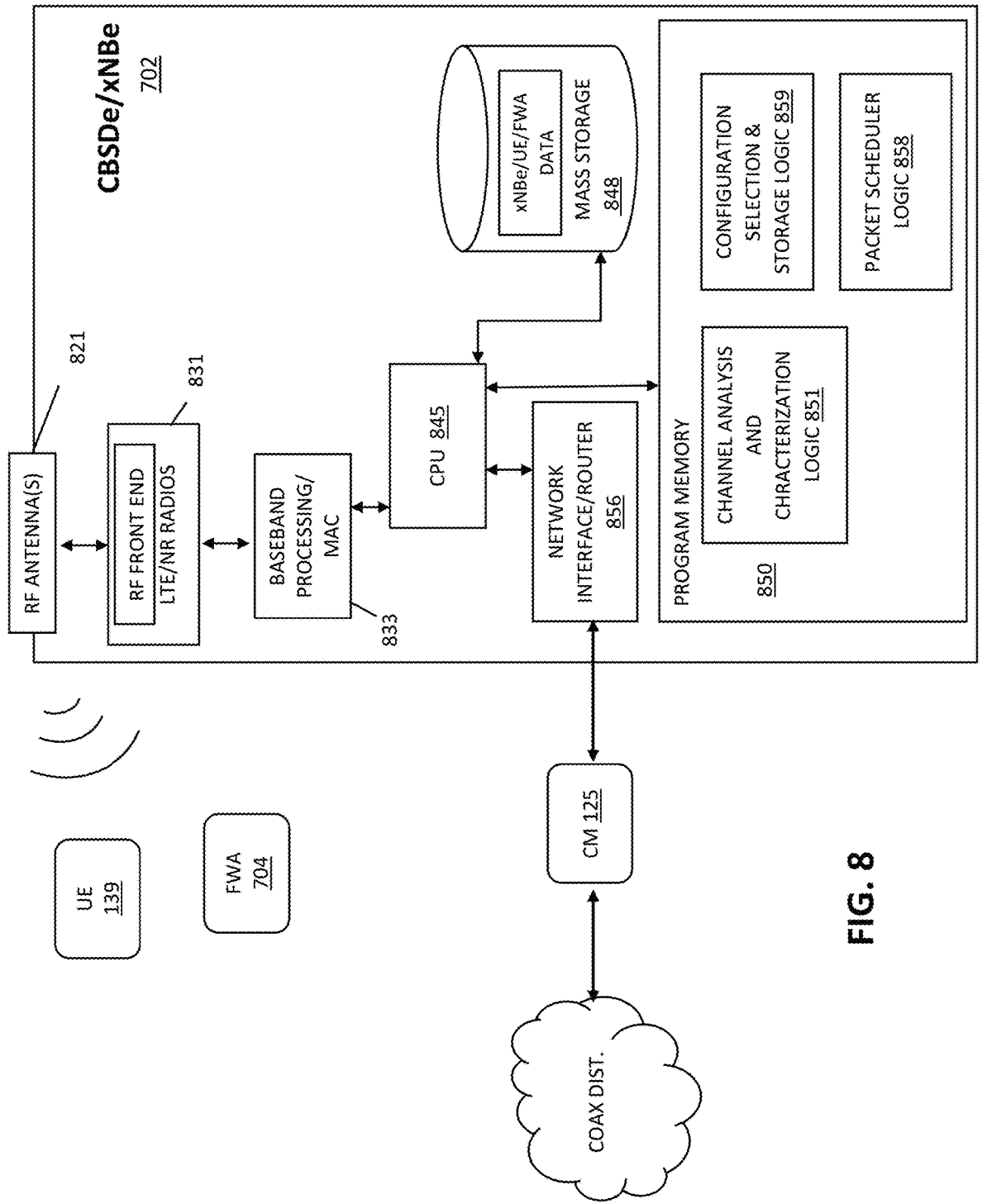
FIG. 8 is a block diagram illustrating an exemplary embodiment of a CBSDe/xNBe base station apparatus according to the present disclosure.

FIG. 8 is a block diagram illustrating one exemplary embodiment of enhanced base station (B Se) apparatus configured for provision of enhanced data traffic prioritization and scheduling functions according to the present disclosure. In this exemplary embodiment, the BSe of FIG. 7 is specifically configured as a CBSD/xNB; i.e., (i) to operate using CBRS quasi-licensed spectrum, and (ii) to utilize 3GPP 4G or 5G technology.

As shown, the CBSDe/xNBe 702 includes, inter alia, a processor apparatus or subsystem 845, a program memory module 850, mass storage 848, one or more network interfaces 856, as well as one or more radio frequency (RF) devices 831 having, inter alia, antenna(e) 821 and one or more 4G/5G radio(s).

At a high level, the CBSDe/xNBe maintains a 3GPP-compliant LTE/LTE-A/5G NR "stack" (acting as a EUTRAN eNB or 5G gNB) communications with 3GPP-compliant FWA 704, UEs (mobile devices 139), as well as any other protocols which may be required for use of the designated frequency bands such as e.g., CBRS GAA or PAL band.

As illustrated, the CBSDe/xNBe device 702 includes (i) channel analysis and characterization logic 851, (ii) packet scheduler logic, and (iii) configuration selection and storage logic 859, such as may be rendered in software or firmware operative to execute on the CBSDe processor (CPU) or a dedicated co-processor thereof.

The channel analysis and characterization logic 851, scheduler logic and selection/storage logic collectively include a variety of functions including receipt and assembly of CQI or other similar channel quality data relating to the individual CPEe 704 (discussed in greater detail below), and characterization of each CPEe. The channel analysis logic is in one variant configured to analyze channel stability, such as to enable selection of a proper model for application of CQI-to-MCS mapping (e.g., one that is well adapted for slower changing FWA channel conditions). The selection logic is in one variant configured to evaluate CQI data values for purposes of selection of other parameters such as the temporal period (T) discussed below, number of MCS "steps" to use in certain conditions or CQI data patterns, etc. Moreover, the logic 859, 851 is also configured to evaluate feedback data obtained from individual CPEe as part of the MCS iteration operations (discussed below) which enable the CBSDe 702 to converge on an optimal transmitter configuration, such as to maximize data rate.

Additionally, the logic 851, 858, 859 further includes processing to support (i) association of particular CQI and feedback data with individual CPEe (each of which may vary from CPEe to CPEe due to e.g., differences in location, physical interferers, noise, etc.), and (ii) storage of CPEe-specific MCS or other transmitter configuration data within the designated CBSDe storage so as to permit "customized" configurations for each different FWAe.

Moreover, in one implementation, the MCS or other configuration data for each individual CPEe can be broken down on an operating mode or configuration basis; e.g., values to be used for when certain MIMO or spatial multiplexing modes are utilized between that CPEe and the CBSDe.

Also, the logic 851, 858, 859 may be configured selectively adjust the Transport Block Size (TB S), such as according to the selected MCS value.

In yet another variant, the logic 851 of the CBSDe may be configured to receive "raw" or constituent ingredient data for the CQI determination for a given CPEe from that CPEe, and conduct the CQI determination based thereon (rather than having the CPEe itself calculate CQI). For instance, the CPEe logic 906 (discussed below) may be configured to return RSRP or similar power measurements, and any other "CPEe-specific" data that may be required, back to the CBSDe such as via an upstream control channel IE (information element), wherein the CBSDe then determines CQI. This determined CQI value may also be transmitted to the relevant CPEe if needed/desired, such as via a downlink control channel.

Yet other variants of the CBSDe logic 859 may be configured to selectively alter other parameters that can be used to optimize channel throughput, such as selective invocation of spatial multiplexing or spatial diversity, where the CPEe and the physical channels can support it.

Further, the channel analysis logic 851 is configured in some embodiments to generate/utilize path loss models for channel conditions between a given CPEe and the CBSDe. These models may be used for example to project initial channel conditions and select MCS, TBS, and/or other parameters such as initial transmitter power.

In the exemplary embodiment, the processor 845 may include one or more of a digital signal processor, microprocessor, field-programmable gate array, GPU or plurality of processing components mounted on one or more substrates. The processor 805 may also comprise an internal cache memory, and is in communication with a memory subsystem 850, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor. Other embodiments may implement such functionality within dedicated hardware, logic, and/or specialized co-processors (not shown).

The RF antenna(s) 821 are configured to detect and transceive signals from radio access technologies (RATs) in the service area or venue with which the CBSDe/xNBe 702 is associated. For example, LTE (including, e.g., LTE, LTE-A, LTE-U, LTE-LAA) signals may be used as the basis of communication between the CBSD/xNBe and the various mobile devices (e.g., UEs 139) or FWA 704. The antenna(s) 821 may include multiple spatially diverse individual elements in e.g., a MIMO- or MISO-type configuration, such that spatial diversity of the transceived signals can be utilized for e.g., increase in coverage area. Spatial multiplexing (SM) may also be utilized by the xNBe 702 to enhance data throughput; i.e., by multiplexing data streams on different antennae.

In the exemplary embodiment, the radio interface(s) 831 comprise one or more LTE/5G-based radios compliant with 3GPP. Additional unlicensed, licensed, or quasi-licensed air interfaces may also be used within the XNBe 702, including e.g., non-CBRS band LTE or 5G NR, or others. Moreover, the LTE radio functionality may be extended to incipient 3GPP-based 5G NR protocols; e.g., at maturation of LTE deployment and when 5G NR-enabled handsets or FWA are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

The RF radios 831 in one embodiment comprises a digitally controlled RF tuner capable of reception of signals via the RF front end (receive chain) of the RF radio(s) in the aforementioned bands, including in one variant simultaneous reception (e.g., both CBRS 3.550 to 3.700 GHz and 2.300 to 2.500 GHz, bands, CBRS and 600 to 800 MHz bands, or Band 71 and Band 12/17 in another configuration). In another variant, mmWave frequencies (e.g., 42-100 GHz) may be used by the air interface(s), especially in applications where direct LOS transmission is possible. In cases where the CBSDe 702 includes multiple such interfaces, they may also be "traded off" or used selectively with certain constituent CPEe, such as where a mmWave band interface is used to service some CPEe, and an LTE or similar interface is used for other CPEe, such as based on their reported bandwidth requirements, presence of LOS or physical obstructions between the CBSDe and the CPEe, etc. It will be appreciated that due to its very high theoretical data rate, mmWave-enabled applications may benefit less from the techniques described herein than say a comparable 4G or 4.5G (LTE-A) CPEe (unless very heavily loaded), and as such the CBSDe may selectively implement the methodologies described herein only for the latter in one variant.

Figure 8A:
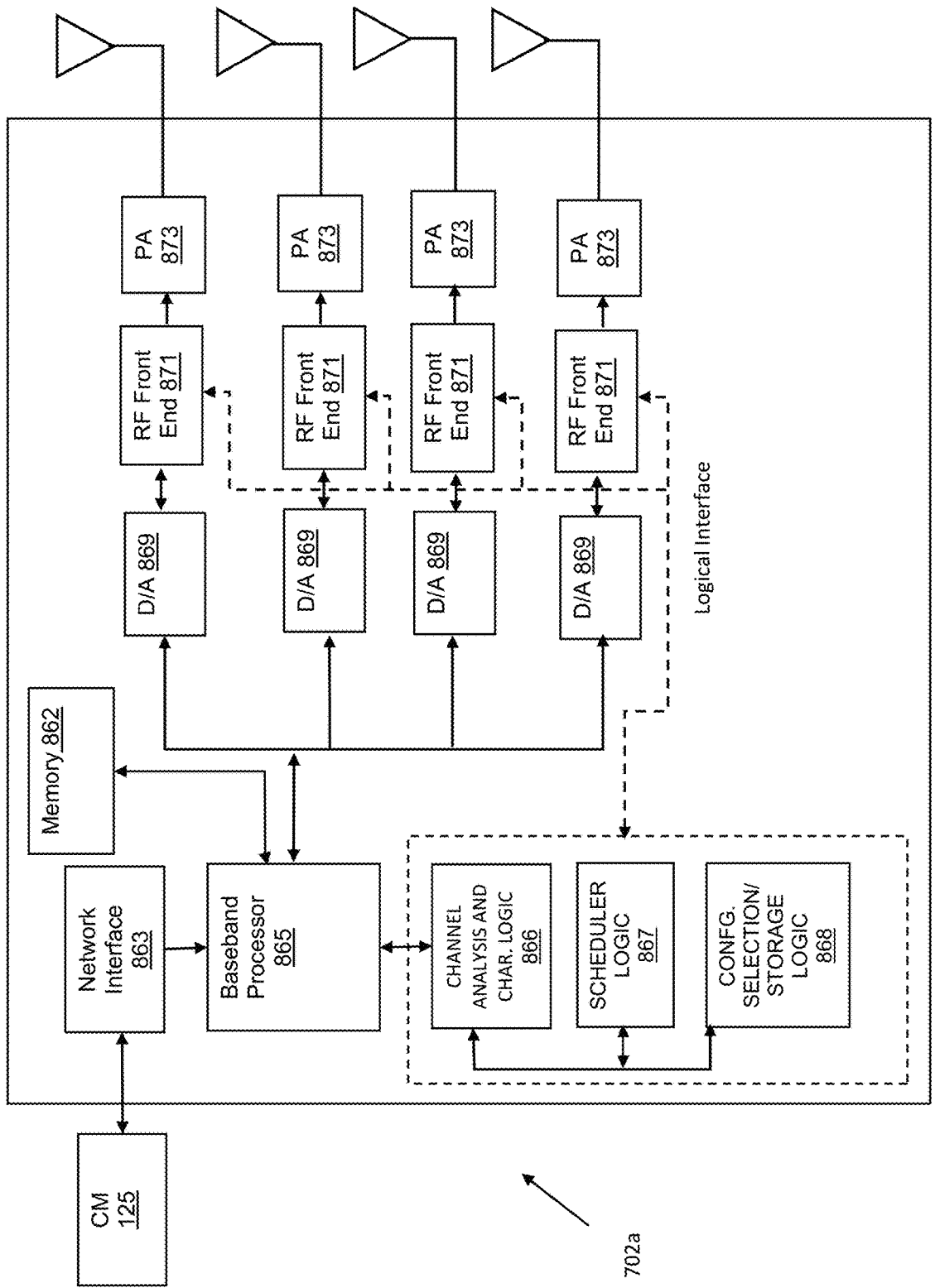
FIG. 8A is a block diagram illustrating another exemplary embodiment of a CBSDe/xNBe base station apparatus according to the present disclosure.

FIG. 8A is a block diagram illustrating one exemplary implementation of the enhanced base station (e.g., xNBe) of FIG. 8, illustrating different antenna and transmit/receive chains thereof.

As illustrated, the device 702a includes baseband processor 865, one or more D/A 869, one or more RF front ends 871, one or more power amplifiers 873, channel analysis and characterization logic 866, scheduler logic 867, and configuration selection and storage logic 868, with comparable functionality to that described previously with respect to FIG. 8. Additionally, the exemplary embodiment includes a network interface 863 that interfaces the xNBe to connect to a data network via e.g., a CM 125, such as for wireline backhaul of the CBSDe to an MSO core or headend.

The components of xNBe 702a shown in FIG. 8A may be individually or partially implemented in software, firmware or hardware. The RF front end 871 includes RF circuits to operate in e.g., licensed, quasi-licensed or unlicensed spectrum (e.g., Band 71, Bands 12-17, NR-U, C-Band, CBRS bands, mmWave, etc.). The digital baseband signals generated by the baseband processor 705 are converted from digital to analog by D/As 869. The front-end modules 871 convert the analog baseband signals radio received from D/As 869 to RF signals to be transmitted on the antennas. The baseband processor 865 includes baseband signal processing and radio control functions, including in one variant physical layer and Layer 2 functions such as media access control (MAC). The Power Amplifiers (PA) 773 receives the RF signal from RF front ends, and amplify the power high enough to compensate for path loss in the propagation environment.

It will also be appreciated that the individual transmitter/receiver chains of e.g., the device 702a of FIG. 8A may be controlled differently than others with respect to configuration (e.g., MCS) based on channel conditions. For instance, in 2x spatial multiplexing configuration (e.g., two antenna elements transmitting different data streams), the physical channels between the two different antenna elements and the receiving CPEe antenna element(s) may conceivably be different, and hence one chain might use an MCS (and/or other configuration parameter such as TBS) different than the other. Similarly, one chain may use different values of parameters, and even different feedback data type or periodicity. Similar logic may be applied for spatial diversity configurations which enhance coverage area.

As such, individual transmitter/receiver channels and chains may be "tuned" or optimized by the logic of the CBSDe so as to achieve best data rate given the individual environment of each, or achieve other goals such as greater scheduler fairness as described in detail elsewhere herein.

CPEe Apparatus—

FIG. 9 illustrates one exemplary embodiment of an enhanced CPE 704 (here, configured as a CBRS FWAe; e.g., roof-mounted or façade-mounted FWA with associated radio head and CPEe electronics) configured according to the present disclosure.

It will also be appreciated that while described in the context of a CBRS-compliant FWA, the device of FIG. 9 may be readily adapted to other spectra and/or technologies such as e.g., mmWave, Multefire, DSA, LSA, or TVWS.

In one exemplary embodiment as shown, the FWAe 704 includes, inter alia, a processor apparatus or subsystem such as a CPU 902, flash memory or other mass storage 904, a program memory module 910 with CQI computation and related logic 906, 4G baseband processor module 916 with 4G/4.5G stack 918, 5G baseband processor module 912 with 5G NR stack 914 (here also implemented as software or firmware operative to execute on the processor), one or more backend interfaces 908 (e.g., USB, GbE, etc.), power module 932 (which may include the aforementioned PoE injector device), a WLAN/BLE module 934 with integrated WLAN router and antennae 936, and 5G wireless radio interface 920 and 4G/4.5G radio interface 926 for communications with the relevant RANs (e.g., 5G-NR RAN and 4G/4.5G RAN) respectively, and ultimately the EPC or NG Core 710 as applicable.

The RF interfaces 920, 926 are configured to comply with the relevant PHY standards which each supports, and include an RF front end 922, 928 and antenna(s) elements 924, 930 tuned to the desired frequencies of operation (e.g., adapted for operation in 3.55-3.70 GHz band, 5 GHz for the LTE/LTE-A bands, C-Band, NR-U bands, mmWave bands, etc.). Each of the UE radios may include multiple spatially diverse individual elements in e.g., a MIMO- or MISO-type configuration, such that spatial diversity of the received signals can be utilized. Beamforming and "massive MIMO" may also be utilized within the logic of the FWAe device.

In one embodiment, the various processor apparatus 902, 912, 916 may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 912.

The various BB processor apparatus may also comprise an internal cache memory, and a modem.

The program memory module 910 may implement one or more of direct memory access (DMA) type hardware, so as to facilitate data accesses as is well known in the art. The memory module of the exemplary embodiment contains one or more computer-executable instructions that are executable by the CPU processor apparatus 902.

In this and various embodiments, the processor subsystem/CPU 902 is configured to execute at least one computer program stored in program memory 910 (e.g., a non-transitory computer readable storage medium). A plurality of computer programs/firmware are used and are configured to perform various functions such as communication with relevant functional modules within the FWAe 704 such as the radio head and WLAN/BLE module 934.

Other embodiments may implement the CQI logic 906 functionality within dedicated hardware, logic, and/or specialized co-processors (not shown). In another embodiment, the module logic 906 is integrated with the CPU processor 902 (e.g., via on-device local memory, or via execution on the processor of externally stored code or firmware).

In some embodiments, the FWAe 704 also utilizes memory or other storage configured to hold a number of data relating to e.g., the various network/gNBe configurations for CQI generation and/or various modes. For instance, the FWAe 704 may recall data relating to SINR to CQI mapping used with a given gNBe 702 or RAN from storage. This functionality can be useful for example when the FWAe is disposed at a location potentially served by several different CBSDe 702; in the case where a given CBSDe or wireless channel associated therewith becomes unavailable or non-optimized for whatever reason, the FWAe can selectively transfer to another serving (candidate) CBSDe, including recall of prior channel quality data obtained therefrom as at least a starting point for further optimization of the then-current wireless channel. Likewise, in the case where an antenna element or elements is/are moved for whatever reason (e.g., the premises installation is changed), prior data for the same or different CBSDe can be used by the FWAe during post-change optimization.

In some variants, the FWAe may also be configured to utilize actual packet throughput data (e.g., an application such as "iPerf" for determining actual data throughput versus lower-layer processes such as based on BER/PER, etc.). In effect, the FWAe can utilize operating processes such as applications obtaining streaming data on the DL to assess or "second check" the optimization by the CBSDe. For instance, the CBSDe may select a given MCS level and/or TBS for a given FWAe based on the processes described herein (i.e., CQI determination, and subsequent feedback to the CBSDe from the FWAe). However, for various reasons, that "optimized" MCS and/or TBS value selection may conceivably not produce the best data throughput for the target application, and hence the iPerf data may be also fed back to the CBSDe logic 859 so that the CBSDe may understand the UP (user plane) data implications of the lower-layer changes it is making.

As discussed in greater detail elsewhere herein, the FWAe (e.g., via the CQI logic 906 or other logic) may perform at least portions of statistical analysis of its collected and/or generated channel data. For instance, in one variant, the FWAe performs a standard deviation or variance analysis on (i) the RSRP or other power measurements it obtains from a given CBSDe over time; (ii) the SINR values generated; and (iii) the resulting CQI values. This data can be stored locally on the CPEe, and periodically updated as new data is obtained. Moreover, this data or select portions thereof can be transmitted upstream to e.g., the serving BSe 702, such as via control channel IE's, or via IP packets generated by the CPEe logic and transmitted to a particular socket or port associated with the CBSDe. Conversely, the raw data may simply be assembled and transmitted to the CBSDe or other network process for further analysis and utilization thereby.

In yet another variant, the CPEe/FWAe 704 may include logic which characterizes its own responses or feedback, such as for transmission upstream to the CBSDe or other network process. For example, where ACK/NACK issuance is used as a basis for feedback, the CPEe logic 906 may gather statistics on e.g., the number and timing of such responses, including as a function of other parameters such as TBS and/or MCS selected by the CBSDe 702. In one such variant, a statistical characterization of ACK/NACK data is generated for different MCS levels (and TBS values) and stored in local memory. This stored data can be used to characterize then-current response/feedback data, such as via comparison of $\sigma/\sigma^2$ for the two data sets, to determine if a given MCS/CQI correspondence has changed over time, such as due to the physical channel changing in some fundamental manner. For instance, a greater or lesser a for current feedback data (or iPerf throughput measured at the higher layers) versus historical characterization data for a given MCS level/TB S combination may be indicative of a permanent change in the RF path environment.

Moreover, as described in greater detail below, the CPEe CQI logic may also be configured to adjust reporting parameters associated with its CQI data transmissions to the CBSDe, such as changes in the periodicity or instigating events associated with such transmissions.

Methodology—

Figure 10:
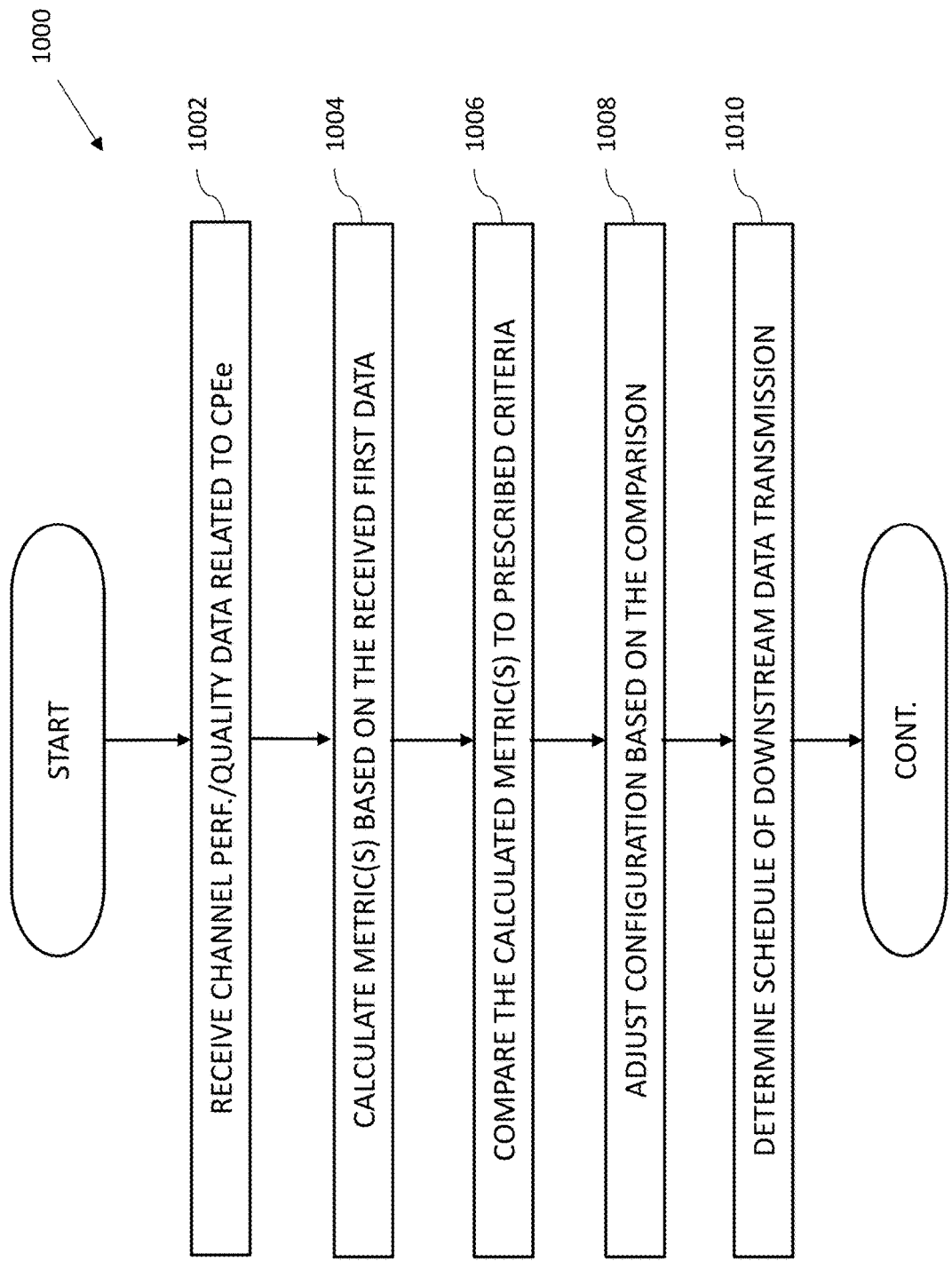
FIG. 10 is a logical flow diagram of an exemplary embodiment of a generalized method of wireless channel assessment and schedule adjustment, according to the present disclosure.
Figure 11:
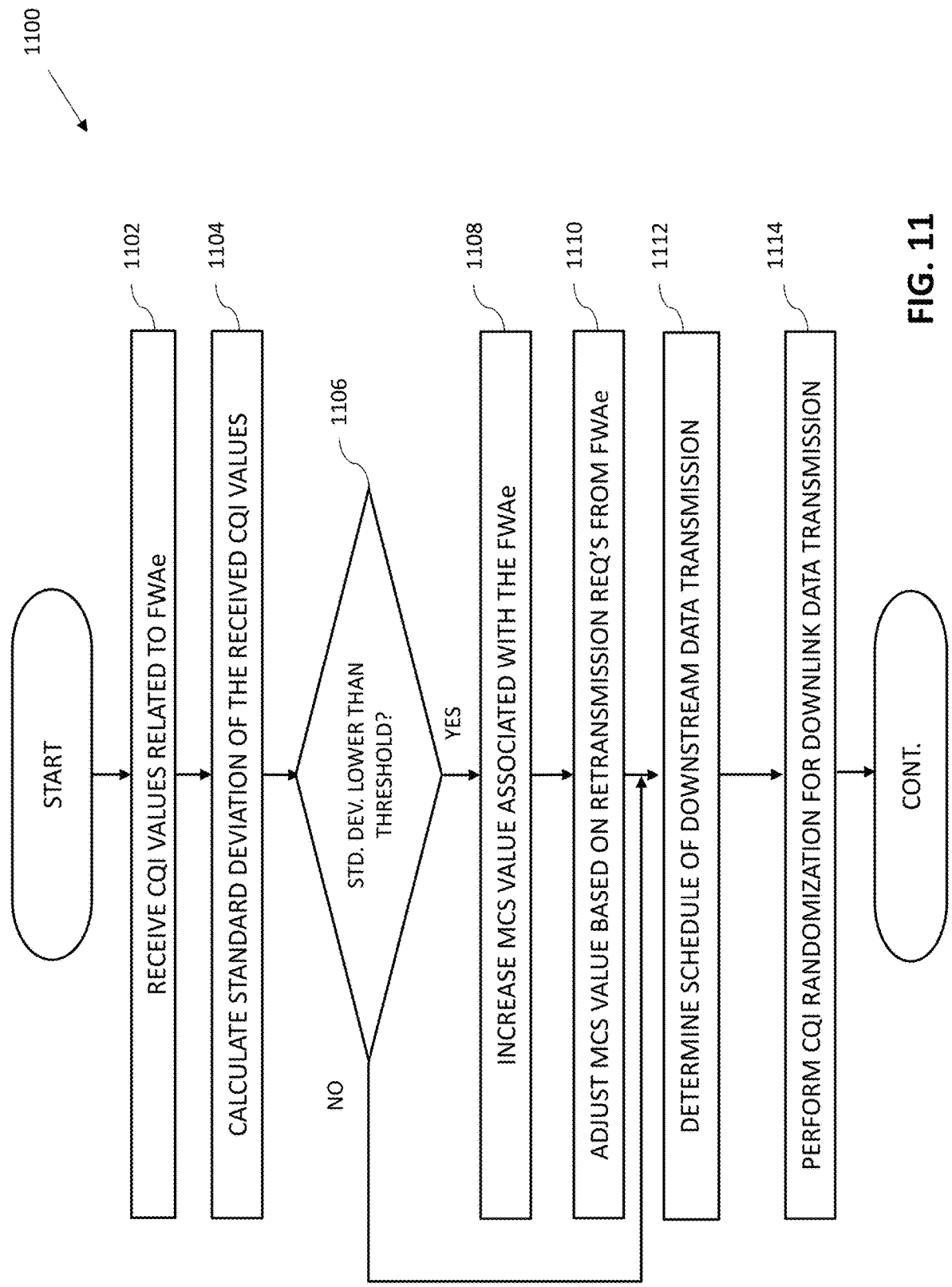
FIG. 11 is a logical flow diagram representing one implementation of the generalized method of FIG. 10.
Figure 12:
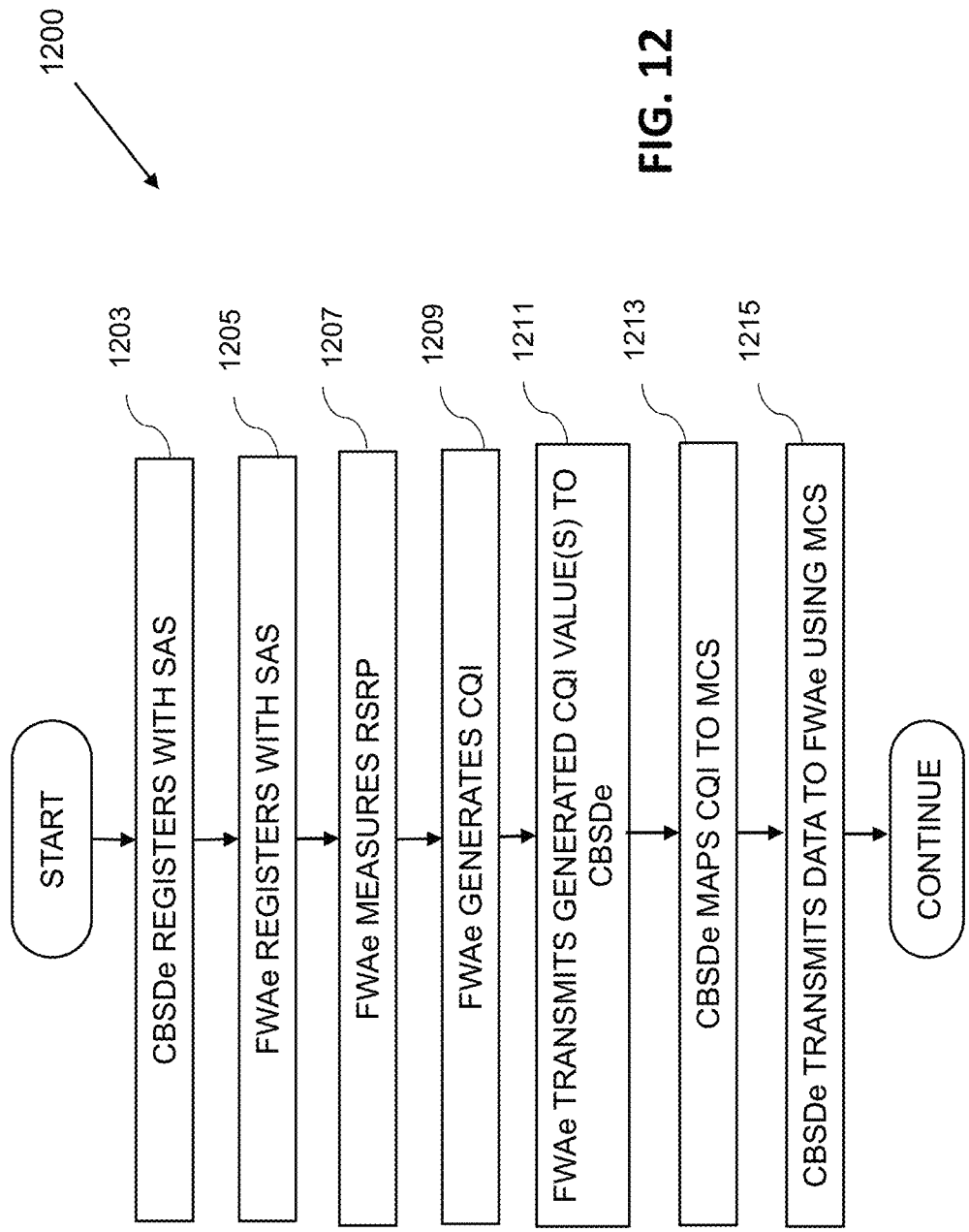
FIG. 12 is a logical flow diagram representing one implementation of the disclosed channel quality determination and reporting process.

Various methods and embodiments thereof for enhancing fairness utilizing adaptive channel quality (e.g., CQI) and randomization techniques according to the present disclosure are now described with respect to FIGS. 10-12.

Exemplary Methods—

Figure 11A:
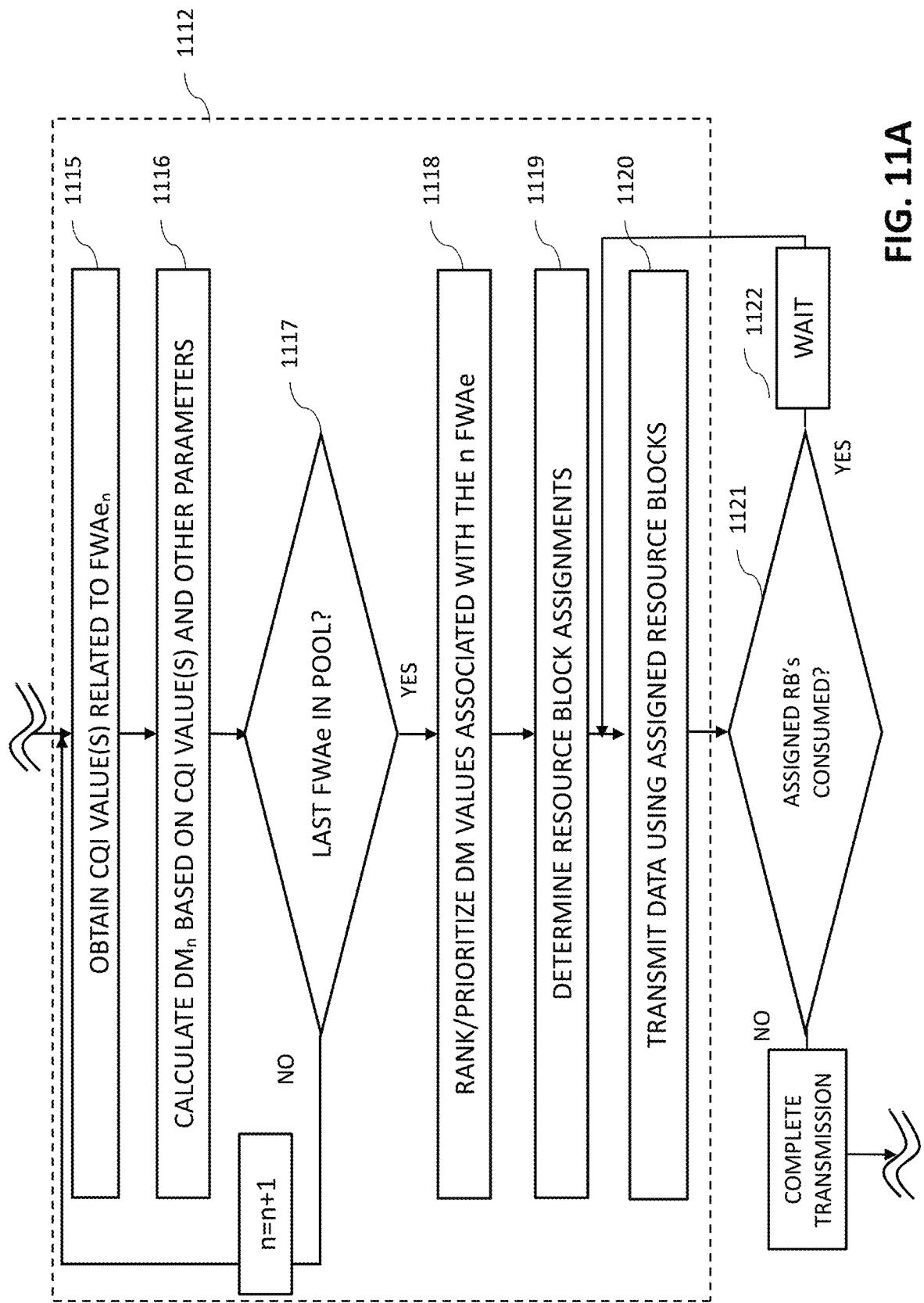
FIG. 11A is a logical flow diagram representing one implementation of the schedule modification process of FIG. 11.
Figure 11B:
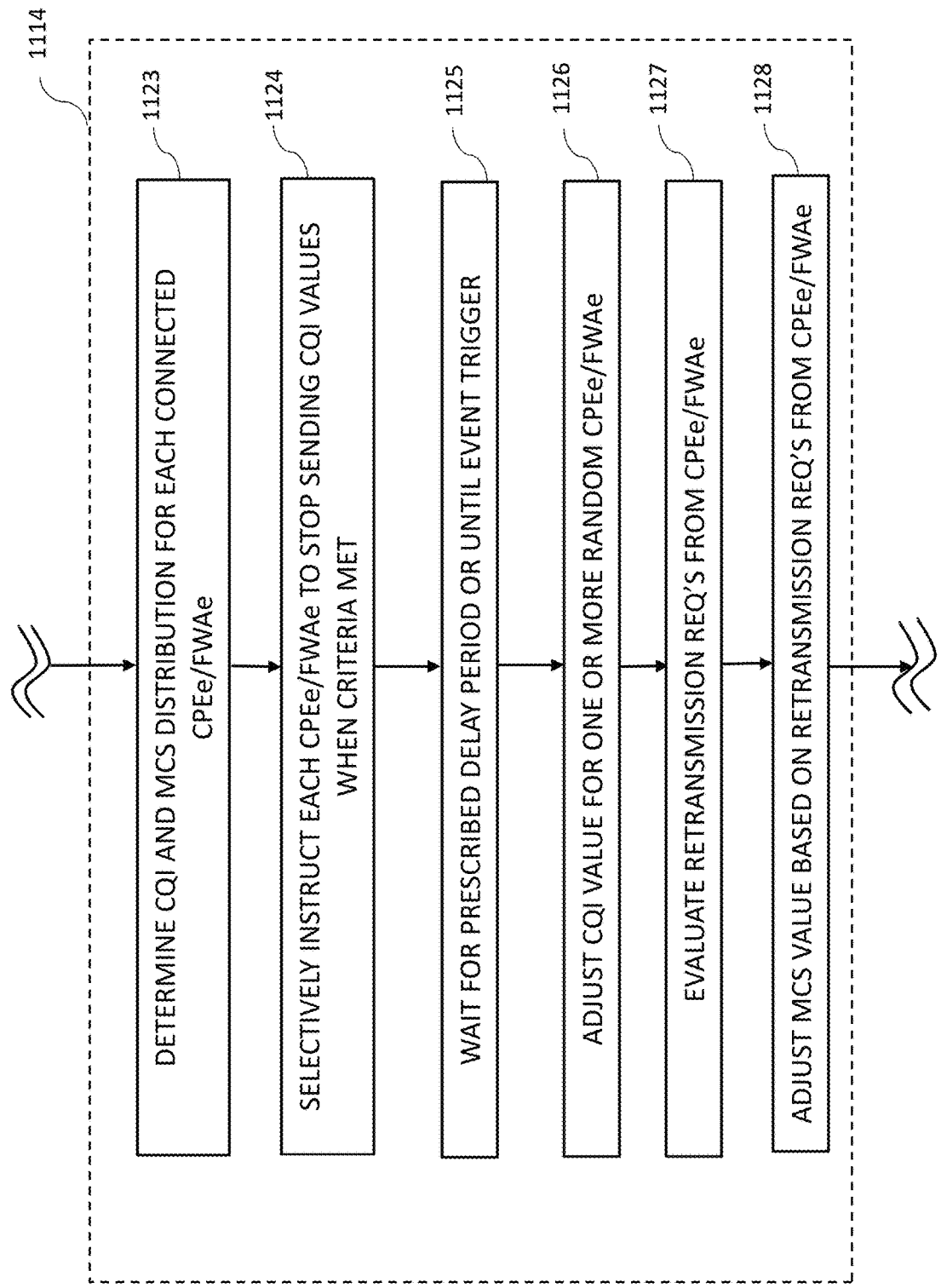
FIG. 11B is a logical flow diagram representing one implementation of the CQI randomization process of FIG. 11.
Figure 11C:
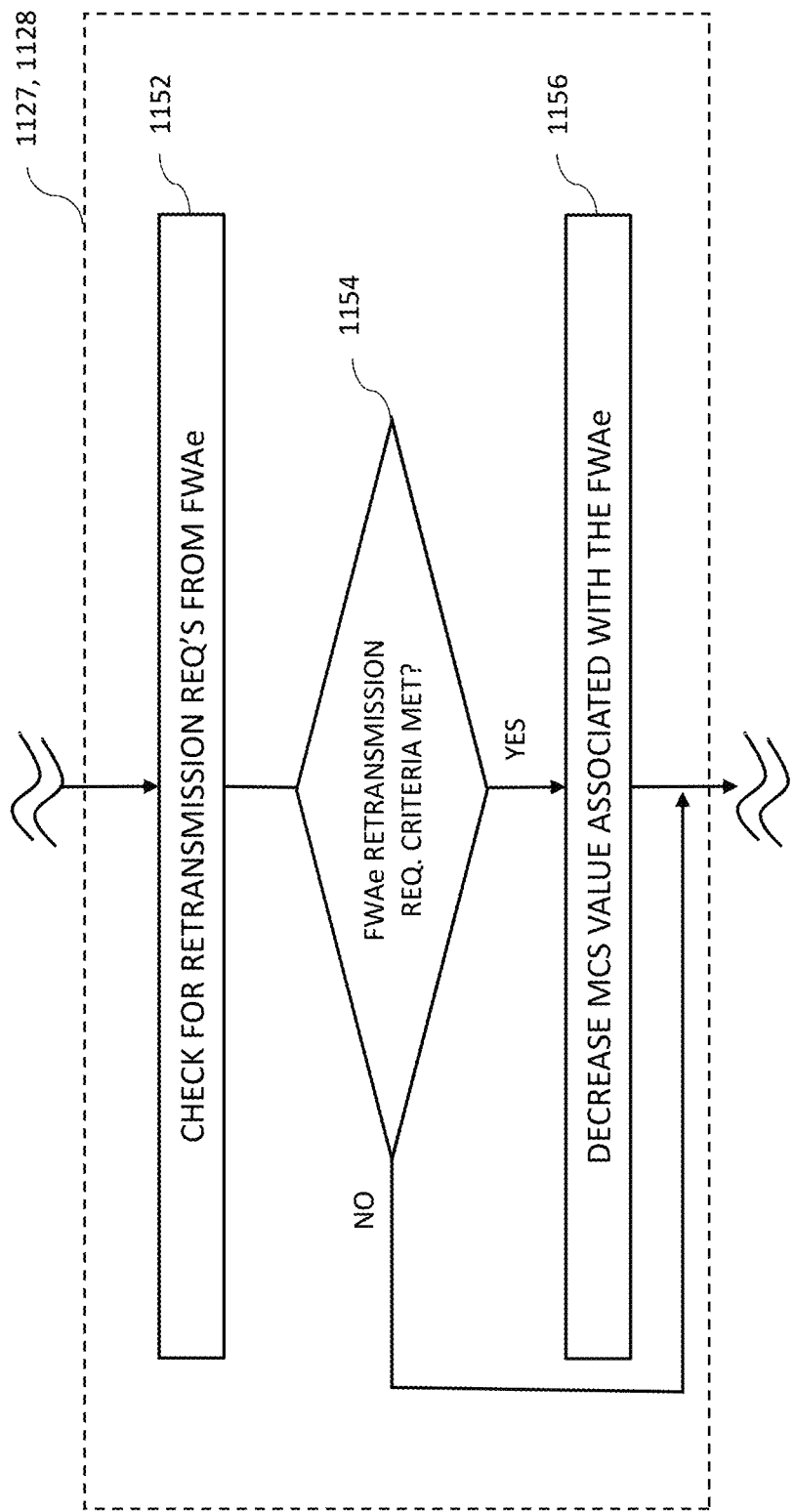
FIG. 11C is a logical flow diagram representing one implementation of the evaluation and RF configuration adjustment processes of FIG. 11B.

Methods for managing channel configuration and data traffic scheduling according the present disclosure are now described with respect to FIGS. 10-11C.

Referring now to FIG. 10, one embodiment of a generalized methodology 1000 for characterizing and managing data traffic (e.g., for DL traffic from a base station to CPEe/FWAe) is shown and described.

At step 1002, first channel performance or quality data related to a given CPEe 704 is received. For example, the CQI value determined by a given CPEe can be reported to the BSe. As described elsewhere herein, the exemplary CQI value is indicative of a communication channel quality being experienced by the CPEe. The CQI value reports can be periodic, or aperiodic (including event-driven). For example, periodic CQI value reports can initially be made, e.g., every 120 ms from a particular CPEe, prior to any suspension invoked by the BSe as discussed below. In one variant, the aperiodic CQI value reports are made only when there is a comparatively rapid change in the channel conditions (e.g., as compared to statistical CQI data obtained for the CPEe 704 as described elsewhere herein, or other criteria). Changes in CQI reporting to the BSe can be made proactively by the CPEe (e.g., based on indigenous CQI logic 906 discussed below), based on directives from the BSe (e.g., transmitted on a DS control channel from the BSe based on CQI or other data received by the BSe), or combinations of the foregoing.

At step 1004, one or more prescribed metrics can be calculated based on the received first data (e.g., the CQI value data). For example, the metric may be a standard deviation of the received CQI values for a particular CPEe, and/or a plurality of CPEe, as discussed in greater detail below.

At step 1006, the calculated metric(s) (e.g., the standard deviation) of the received first data can be evaluated or compared to a prescribed criteria, such as threshold value. In one variant, the prescribed threshold value may be determined by a network operator (e.g., MSO operating the small-cell network) based on how much variation in the reported CQI values from the CPEe/FWAe can be deemed sufficient for (i) introduction of randomization into the MCS levels/CQI values as discussed subsequently herein, and/or (ii) a determination that such CQI values would ensure diversity/"fairness" in the DS data traffic to the CPEe/FWAe relative to other CPEe/FWAe connected to the base station. For instance, a low level of CQI variation (and hence a statistically "narrower" distribution of CQI values for a given CPEe) is indicative of greater physical channel stability, and hence ostensibly a greater need for randomization/fairness.

At step 1008, based at least on the result of the evaluation described with respect to step 1006, the configuration of the BSe or portions thereof associated with the channel can be adjusted. For example, the MCS value and/or TBS associated with data transmission to the CPEe can be adjusted based on the reported CQI values.

In one variant (see discussion of FIGS. 11-11C below), the MCS/TBS value associated with the particular CPEe/FWAe under consideration can be increased to see if the CPEe/FWAe can successfully receive or decode data traffic transmitted using such value(s). As used in the present context, the term "successfully" may include any number of different possible criteria, including e.g., (i) error-less decode, (ii) decode to a prescribed maximum allowable level of error (e.g., BER/PER≤10 E-18 or some other value), (iii) decode after a prescribed number of retries or "NACK" transmissions, (iv) receipt associated with a suitable level of packet data throughput (such as measured by an iPerf process on the CPEe), or any number of other metrics relating generally to the concept of meeting a prescribed level of performance or task completion.

At step 1010, a schedule for the (e.g. DS) data traffic transmission to the CPEe/FWAe can be determined by the scheduler process logic 858 (FIG. 8). For example, increasing the MCS level of the DS data traffic for a given CPEe/FWAe (and in some cases contemporaneously and/or subsequently adjusting the MCS value/DS data traffic priority for other CPEe/FWAe) can ensure a certain level of diversity/"fairness" is achieved with respect to the DS data traffic to a number of CPE/FWA, since each CPEe/FWAe will to some degree be "pushed" by the CBSDe logic to make better utilization of its available physical channel (whatever that may be). Referring now to FIG. 11, one implementation of the generalized methodology 1000 of FIG. 10 is shown and described.

At step 1102, as described above, CQI values for each connected CPEe/FWAe can be received. For example, the CQI values can be received at prescribed time intervals, and they would indicate then-current status of the communication channel quality being experienced by the CPEe/FWAe at its given location.

At step 1104, a prescribed number of CQI values are utilized to calculate a standard deviation of the CQI values for a particular CPEe/FWAe. The standard deviation can be utilized to determine, among other things, how much variation is observed in the reported CQI values, and hence the relative stability of the channel, or a larger population of channels. As discussed in greater detail subsequently herein, a high standard deviation would indicate a high level of variation in the reported CQI values (representative of, e.g., fluctuating RF environment surrounding a given CPEe), while a low standard deviation would indicate a low level of variation; e.g., static RF environment surroundings the CPEe. For a CPEe/FWAe which is, e.g., installed in a rural area (a network edge), a low standard deviation may indicate a low variation being observed in the RF conditions surrounding the CPEe/FWAe. When the variation in the RF conditions is low, resulting in a low variation in the CQI values reported to the base station, there would be little variation in the DS data traffic from the base station to the CPEe/FWAe device in terms of the MCS (and ultimately the scheduler the priority level) associated with the DS data transmission. Thus, the CPEe/FWAe may continue to be assigned a similar MCS and a similar priority of DS data transmission from its connected base station, which would mean that the UE connected to such CPEe/FWAe may continue to experience a particular level of data services (which would be consistently higher/lower, the consistency resulting in the lack of diversity/"fairness" among various UE as described supra). Hence, the variability of the CQI for a given CPEe/FWAe can be used as a determinant of whether that device is susceptible to such "stagnant" channel conditions and prioritization within the BSe scheduler algorithms.

Other metrics of possible utility in such determinations may include e.g., statistical variance, correlation to various other events or parameters (e.g., traffic loading of other nearby CPEe, time of day, day of week, particular scheduled or unscheduled events such as weather phenomena), and similar which may allow the BSe (or a proxy node thereof, such as a cloud analytics process operated by the MSO or a third party) to more accurately characterize each particular CPEe.

Moreover, the CQI data for a given CPEe can be evaluated and correlated with similar data for other CPEe, such as those geographically nearby, those in similar installation configuration (e.g., façade-mounted FWAe used in urban areas on MDUs or apartment buildings, pole- or roof-mounted FWAe in low density rural areas, etc.).

Another metric of utility in some implementations is the rate of CQI change experienced by a given CPEe. For instance, two hypothetical sets of CQI data for a given CPEe channel may have the same statistical σ or σ', yet exhibit very different characteristics in terms of rate of CQI change as a function of time. Rapid transients in CQI may be indicative of certain natural or man-made phenomenon, such as e.g., vehicles or other objects moving rapidly through at least part of the RF propagation path, fast-moving weather phenomenon such as thunderstorms, energization and de-energization of RF interferers, or even loose or "wobbly" antenna elements on the CPEe. Conversely, slower rates of CQI change may be associated with slower weather phenomena, foliage growth, construction of buildings or billboards, etc.

Similarly, analysis of the repetition or frequency of such transients can be useful in characterizing e.g., RF path stability. If the transients are infrequent and seemingly randomly distributed in time, this may be indicative of a phenomenon which is spurious/unpredictable. Conversely, highly regular changes in CQI which have associated large magnitude swings tend to indicate man-made sources such as radar or other such radiators.

Returning again to FIG. 11, at step 1106, the measured metric(s) is/are compared to the associated criterion/criteria; e.g., in this example, standard deviation associated with the CQI values for the particular CPEe/FWAe is compared against a prescribed threshold level, the latter based on e.g., historical analysis of data relating to a pool or plurality of CPE/FWA, the individual CPEe/FWAe itself, or combinations thereof. For example, the MSO may accumulate data over time indicating that below a given σ, the "stagnant" prioritization within the scheduler is minimized or does not occur (i.e., CQI variations are significant/frequent enough to perturb the statistical processes sufficiently that a given CPEe/FWAe is not resigned to long periods of over- or under-performance).

At step 1108, if the measured standard deviation is lower than the prescribed threshold level per the comparison at step 1106, the MCS value assigned for the CPEe/FWAe based at least on the reported CQI values can be adjusted. In one implementation, based on reported CQI from the CPEe/FWAe, the CBSDe selects the optimum modulation level, or MCS level using the CQI curve for each individual CPEe (the curve is implicitly an MCS curve). Hence, the CBSDe has an individualized MCS curve for each CPEe in the network. For example, a particular MCS value (indicating a prescribed MCS and priority level to be associated with the DS data transmission to the CPEe/FWAe via the BSe scheduler) associated with the CQI reported by the CPEe/FWAe (according to the mapping table discussed elsewhere herein) can be perturbed; e.g., increased to a higher MCS value associated with a higher CQI than the reported CQI. If the prevailing value of MCS is too low (i.e., before adjustment), then the increase of MCS and/or TBS per step 1108 will often not cause the channel to be overloaded (depending on the proximity of the prevailing MCS/TBS to the actual channel limits). Conversely, if the prior channel MCS was too high, the feedback loop described elsewhere herein would generally tend to push the MCS/TBS lower until the feedback criterion was met (i.e., no NACKs received by BSe after transmission to CPEe/FWAe), and hence the methodology of FIG. 11 presumes that the starting MCS per step 1108 is generally commensurate with a level below channel (physical) capacity, and hence increases MCS and/or TBS on its initial "try".

At step 1110, the MCS value can be further adjusted based at least on any feedback data (e.g., retransmission requests) from the CPEe/FWAe. See the discussion related to FIG. 11C presented infra for more details on exemplary implementations of this step.

At step 1112, the scheduler can be updated with latest CQI values associated with the MCS/TBS values generated by the algorithm. For example, in one approach, the algorithm is allowed to sufficiently "settle out" in terms on converging on a given MCS/TBS for a given CPEe/FWEe (and hence its associated changed CQI value). Only after the algorithm has converged on such value with a given level stability for the given device (e.g., rate of MCS and/or TBS adjustment is below a prescribed threshold) is the new data fed to the scheduler (which changes the prioritization for that CPEe/FWAe). Alternatively, in another approach, the plurality of CPEe/FWEe are treated as an ensemble, and convergence of all or a prescribed number of CPEe/FWAe within the pool/ensemble on a sufficiently stable value is a precondition for transmission of new CQI updates to the scheduler. Yet other approaches will be recognized by those of ordinary skill given the present disclosure.

At step 1114, a CQI randomization process for subsequent DS data transmission(s) can be performed, such as to periodically perturb the system/scheduler and determine whether any additional throughput or stability gains can be made. See the discussion related to FIG. 11B for more details on exemplary implementations of this step.

Referring now to FIG. 11A, one particular implementation of the schedule determination methodology (step 1112) of FIG. 11 is shown and described in detail.

At step 1115 of the method of FIG. 11A, the enhanced scheduler collects all CQI values from all CPEe in the network which its serves or is connected to. This may include for example collection via normal CQI collection means present in extant 3GPP protocols, and may also be conducted over a period of time (e.g., to collect multiple values for each CPEe). The scheduler may also utilize historical data if available for such purposes (such as that stored on a local or accessible cloud storage device).

Next, at step 1116, the scheduler calculates a metric such as a Decision Metric (DM) for each CPEe. The decision metric is used to make decisions regarding the "owner" of next resource block (RB) or group of resource blocks to be scheduled. An example decision metric (for a proportional fair scheduler) is shown in Eqn. (1), although other approaches may be used consistent with the present disclosure:

$$DM_n = k^* CQI_n / T_n \qquad \text{Eqn. (1)}$$

where:

k is a proportionality constant (as required;

n is the index of the CPEe being evaluated; and

T is the average amount of data throughput sent to $CPEe_n$ until the time of the DM calculation.

Hence, for FWAe with high CQI values (e.g., physically proximate to the BSe), as the amount of data they consume in the DL increases, their DM decreases, tending to weight them less heavily. Conversely, "starved" FWAe with lower CQI but also lower values of T will tend to be elevated in DM as they receive less data throughput over the measurement period.

It will be appreciated that while a generally proportional relationship is shown in Eqn. (1), other approaches can be used. For instance, the determination of DM for a given FWAe may be implemented as a step-wise or discontinuous function, such as where membership of the FWAe in a given CQI class or tier determines at least in part its ultimate DM. For example, a set of three (3) FWAe which are generally comparable in range to the serving BSe and which have relatively comparable CQI might comprise a first tier, with three other FWAe that are distant from the BSe having significantly lower CQI (generally comparable to one another) constituting another tier, this latter tier having a more aggressively weighted DM calculation associated therewith so as to more evenly balance data throughput members of that tier with that of the first tier. In another variant, the data throughput (T) can be used to scale the DM value calculation; when a given FWAe achieves a given level of average throughput for example, it is then algorithmically "back seated" relative to more starved FWAe at least until a general parity in throughput is achieved over a prescribed measurement period. Yet other schemes will be recognized by those of ordinary skill given the present disclosure.

Next, when the calculations of DM values for each FWAe in the pool being considered (which may be all or a subset of connected/served FWAe) is completed per step 1117, at step 1118, the enhanced scheduler ranks the DM values calculated in step 1115 (which may be performed iteratively, or on a periodic basis). In one variant, the DM calculated for each CPEe is ranked from largest to smallest magnitude. In another approach, the DM values are put into prescribed bins or buckets (each comprising a given range, each range which may be linear or non-linear as a function of DM), with a population of DM values in each bucket used as a basis for further selection. For instance, in one variant, if there is a predominant distribution of FWAe DM values at one end of the scale (e.g., most are in the lowest or a lower "bucket"), then they are collectively de-prioritized (according to a prescribed scheme, such as random selection within that bucket) over those with higher DM values, or vice versa. In another variant, FWAe having DM values in a common bucket are selected according to a round-robin, randomized, or other such approach.

At step 1119, the enhanced scheduler assigns the all available resource blocks to the ranked CPEe, starting in one configuration from the CPEe with highest DM to that with the lowest DM.

Per step 1120, the scheduler utilizes the RB assignments and sends data to the CPEe with the highest DM first, and other CPEe thereafter. In one implementation, the scheduler is configured to empty the data buffer/queue of the then-serviced CPEe before utilizing RBs for other CPEe.

In one variant, if there are no resources left to be scheduled (step 1121), those CPEe with the lowest associated DM values or priorities will wait for a next scheduling opportunity (step 1122) in succession. This will increase the delay for those CPEe.

It will also be recognized that in the exemplary embodiment, the enhanced scheduler solely schedules resource blocks (RBs) in the network, with the RBs comprising two dimensional resources (both time and frequency). Hence, the scheduler may schedule blocks on the same carrier(s) or different carrier(s) for the same CPEe, depending on availability of resources.

In some variants of the method, the scheduler repeats the foregoing process at each TTI (e.g., 1 msec.). As noted elsewhere herein, the higher the number of CPEe serviced, the more the computations that scheduler will perform since scheduler has to calculate DMs for each CPEe in the network in 1 msec, since the next data transmission via assigned RBs will happen within the next 1 msec. However, since the enhanced scheduler is able to obtain CQI values for each CPEe (after collection of sufficient data) directly from the stored distribution, rather than actual continuous reporting, the foregoing process is simplified over that of prior art schedulers.

Moreover, as previously indicated, in some embodiments, the scheduler can extrapolate or calculate RB allocations for several TTIs in succession, thereby obviating per-TTI determinations. For instance, the scheduler may determine the allocations for 2, 3, 5 or 10 TTI intervals (or based on other values) at each calculation increment, thereby reducing the calculation overhead proportionately. These values can be reliably projected due in part to high relative channel stability across the served CPEe.

Referring now to FIG. 11B, one particular implementation of the CQI perturbation (e.g., randomization) methodology (step 1114) of FIG. 11 is shown and described in detail.

At step 1123, a CQI (and MCS) distribution for each "connected" CPEe/FWAe is determined. It will be appreciated that statistics may be gathered on CPEe/FWAe that are not then connected per se, but rather opportunistically as they are connected. For instance, a given CPEe/FWAe may be connected at one time, not connected at another, and then reconnect later, but notwithstanding its RF data while connected is useful in determining the statistical distributions of step 1123.

In one implementation, a data structure such as a local (BSe) database can be utilized to maintain a CQI distribution (of reported CQI values from each connected CPEe/FWAe) and MCS distribution (of either mapped or adjusted MCS values for each connected CPEe/FWAe). The adjusted MCS values may be based on, e.g., the increase (and further adjustment) discussed with respect to steps 1126-1128.

In one variant, the statistical data for each CPEe/FWAe is further processed to identify a CQI value representative for that CPEe/FWAe, such as via calculation of a moving mean or median value within a prescribed window of time. In another variant, a linear or other regression analysis is performed on the data (by the BSe or a connected network process such as a controller) in order to characterize the channel between the BSe and the CPEe/FWAe over the prescribed period of time.

Hence, based on the foregoing, it will be appreciated that the exemplary algorithms used by the BSe in characterizing each CPEe/FWAe may assess each of (i) stability or rate of change of CQI, and (ii) deviation or variance of the data (indicating how tightly grouped the data is over time, irrespective of rates or frequency of change) if desired.

At step 1124, each connected CPEe/FWAe may be instructed not to send any more CQI values when one or more suspension criteria met.

For example, a given CPEe/FWAe may be provided a message to stop sending CQI values for a given period of time, or the base station can determine to ignore the CQI values from any CPEe/FWAe after a given point in time. The former option is generally more desirable from the standpoint of minimizing upstream CQI data transmissions and associated overhead/processing, but the latter option affords the ability of non-enhanced CPEe/FWAe to be serviced (e.g., those that may not have upgraded firmware which enables receipt and implementation of the suspension message from the BSe).

In one variant, the timing associated with such stoppage may be based on for example a period of time for which the measured standard deviation of the reported CQI values has been consistently lower than a prescribed threshold (e.g., on a moving average basis), and/or based on rate of change of CQI over a prescribed period of time (i.e., lower rates of change tend to indicate longer periods of suspension can be supported). In another variant, the timing and the duration of such stoppage may be arbitrary, e.g., randomized, or according to the setting by a network operator (for example based on one or more policies). The suspensions may also be tied to operational factors such as individual CPEe/FWAe or BSe loading (e.g., to minimize upstream bandwidth consumption under heavily loaded conditions, assuming sufficient statistics are present), or event-driven (e.g., when an event which historically or under modeling indicates that a salient change in channel conditions may occur or has occurred, such as a maintenance event on the CPEe or BSe which might affect antenna element alignment and require "recalibration").

At step 1125, the algorithm waits for either a given period of time or until an event such as those described previously triggers a modification or adjustment to CQI/MCS or TBS for a given CPEe/FWAe per step 1126. For instance, the CQI value(s) associated with one or more connected CPEe/FWAe according to the generated CQI distribution are perturbed (increased) after expiry of the period or event occurrence. In one implementation, at predetermined time intervals, the one or more CPEe/FWAe that are then "suspended" for CQI can be selected at random, and the CQI value(s) associated with the selected CPEe/FWAe can be increased. The increase may in one instance be selected based on the characterization/statistical distribution for that CPEe/FWAe previously generated; e.g., by purposely selecting a "data outlier" from the statistical distribution. For instance, if the historical distribution of a given CPEe/FWAe has a $\sigma=\sigma_1$, the perturbation algorithm of FIG. 11B may select a perturbation value at $N \times \sigma_1$ (e.g., 2× or 3×) to be used with the scheduler logic for at least a period of time, such as until steps 1127 and 1128 discussed below are completed and the CQI converges on a new value (which may or may not be different than the CQI at time of suspension for the CPEe/FWAe).

The perturbed (e.g., increased) CQI values can be mapped to higher MCS values, e.g., per mapping according to the tables from the 3GPP TS 36.213 as discussed elsewhere herein, or other MSO-derived mappings. The increased MCS value (and also the increased transport block size for sending more data) can, e.g., increase the priority associated with the DS data traffic to the randomly selected CPEe/FWAe relative to other CPEe/FWAe connected to the base station, which helps ensure that the diversity or "fairness" in the DS data traffic from the base station is achieved (e.g., with different, random CPEe/FWAe devices being perturbed and assigned different priorities for data delivery at a given point in time).

Specifically, as previously described, the scheduler will calculate the same decision metrics (DMs) for each CPEe, and ranking of the CPEe based on DMs will generally be the same at each scheduling instance due to the stable CQI/channel for each. Therefore, CPEe with the lower reported CQIs (e.g., those further away from the CBSDe) may starve for data. Hence, introduction of some randomness is used to perturbate this same DM ranking so that such low DM CPEe also receive their fair share of data during scheduling (or at least will not wait for an extended period).

At steps 1127 and 1128, the MCS/TBS values can be further adjusted based at least on any retransmission requests from the CPEe/FWAe (and/or other feedback data or criteria such as e.g., iPerf data from the CPEe/FWAe or devices connected thereto.

Moreover, as previously noted, running the scheduler process in the CBSD is costly in terms of hardware and software resources. Under the prior art approach, at each TTI (1 msec.), the scheduler collects all CQI values from all CPEs in the network and distributes the available resource of the CBSD among the served CPE in the network. Conversely, in the methodology of FIGS. 11-11c, a CQI distribution is created for each CPEe/FWAe, and these distributions are used to make better scheduling decisions rather than necessarily receiving and processing all CQI values from CPEs. This reduces the time of scheduling for all CPEe/FWAe, and also less software and hardware resources are used (including UL channel resources to transmit the data). This is enabled in large part by the relative stability of each channel, at least in the short-term (i.e., relative to a device with mobility, which may have a large degree of short-term variation).

Further, by knowing the CQI curve or distribution of each CPEe in the network, the improved scheduler disclosed herein can also schedule data for several successive TTIs rather than for the next single CQI data point received, since the scheduler can estimate the value of CQI for the next several TTIs. This is particularly advantageous in light of the recognition that all CQI values sent to the CBSDe may not be accurate, and hence the CBSDe can skip inaccurate CQI values, and not schedule data to CPEe/FWAe whose CQI value is determined to be inaccurate or erroneous. Stated differently, rather than the scheduler "chasing its tail" on a CQI value to CQI value basis (some of which may be erroneous), a statistically smoother and more accurate aggregation of data is utilized, which also leads to better utilization of resources since each CPEe/FWAe will be scheduled at least some data (including those with lower CQI values due to greater range from the CBSDe, thereby promoting greater fairness).

Referring now to FIG. 11C, one implementation of steps 1127 and 1128 of FIG. 11B is shown and described.

At steps 1152-1154, the BSe checks the feedback criteria (e.g., for one or more retransmission requests from the CPEe/FWAe for which the MCS value was increased). For example, depending on the increased MCS value and the increased amount of data (e.g., via increased transport block size for the DS data transmission), as well as the amount of data that the CPEe/FWAe can handle/decode (e.g., based on its capabilities and/or surrounding RF conditions), a retransmission request may be received from the CPEe/FWAe.

At step 1156, based on the determination that the feedback criteria is/are met, such as a prescribed number or frequency of retransmission request(s) being received from the CPEe/

FWAe per step 1154, the MCS and/or TBS value associated with the DS data transmission to the CPEe/FWAe is decreased. For example, based on a number of retransmission requests received from the CPEe/FWAe (e.g., the number meeting or exceeding a threshold number, or per unit time), the base station can determine that the CPEe/FWAe is not able to decode the amount of data sent DS (based on the increased MCS value) from the base station.

Subsequent to the decrease in the MCS value per 1156, as shown in FIG. 11C, the base station can continue to check for additional feedback such as a retransmission request from the CPEe/FWAe and repeat steps 1152-1 1156 to find a MCS/TBS value which results in the "maximum" amount of data sent DS that the CPE/FWA can reliably decode.

It will be appreciated by a person of ordinary skill in the art that if, at step 1154, the initially increased MCS value does not result in any negative feedback such as retransmission request being received from the CPEe/FWAe, the base station can also continue to further increase the MCS value (not shown) until the aforementioned "maximum" amount of data that the CPEe/FWAe can handle is identified. As noted elsewhere herein, this process may also be iterative over a period of time, including a convergence on a "settled" value for the parameters being varied which can then be written to storage for updating the statistical/historical data for that CPEe/FWAe.

Furthermore, given at least the randomization described above, overall efficiency in the DS data transmission from the base station can be monitored over a prescribed period of time to determine whether the overall efficiency is impacted in any way by the randomization (not shown). For example, if there is no significant improvement, the foregoing methods can introduce one or more "outliers" (e.g., for which CPE/FWA to adjust the CQI/MCS for, how much to adjust the CQI/MCS by, etc.) to see if any improvement can be brought about. Conversely, if degradation is shown to occur, the perturbation values may be made less aggressive.

Additionally, the foregoing randomized scheme for CPEe/FWAe perturbation may be used in conjunction with, or replaced by, other schemes. For instance, in one implementation, CPEe/FWAe are selected for perturbation (i) after having achieved suspension as dictated by the serving BSe or associated network controller, and (ii) according to a round-robin or other technique which determines CPEe/FWAe selection. Such technique may be based on the average/peak value of CQI for a given CPEe/FWAe; e.g., such that those with characteristically or statistically the highest average or peak CQI readings are reduced in frequency for selection by the perturbation algorithm.

Moreover, the perturbation algorithm may be configured to operate effectively in reverse; i.e., selecting CPEe/FWAe for reduction of MCS/TBS (and CQI), which in effect de-weights or de-prioritizes them for at least a period of time relative to other CPEe/FWAe not so selected.

FIG. 12 shows one implementation of a method 1200 for CQI determination and utilization, in the context of the CBRS-based architectures previously discussed (e.g., CBRS spectrum, CBSDe, and FWAe utilizing 3GPP 4G or 5G technology).

Figure 3:
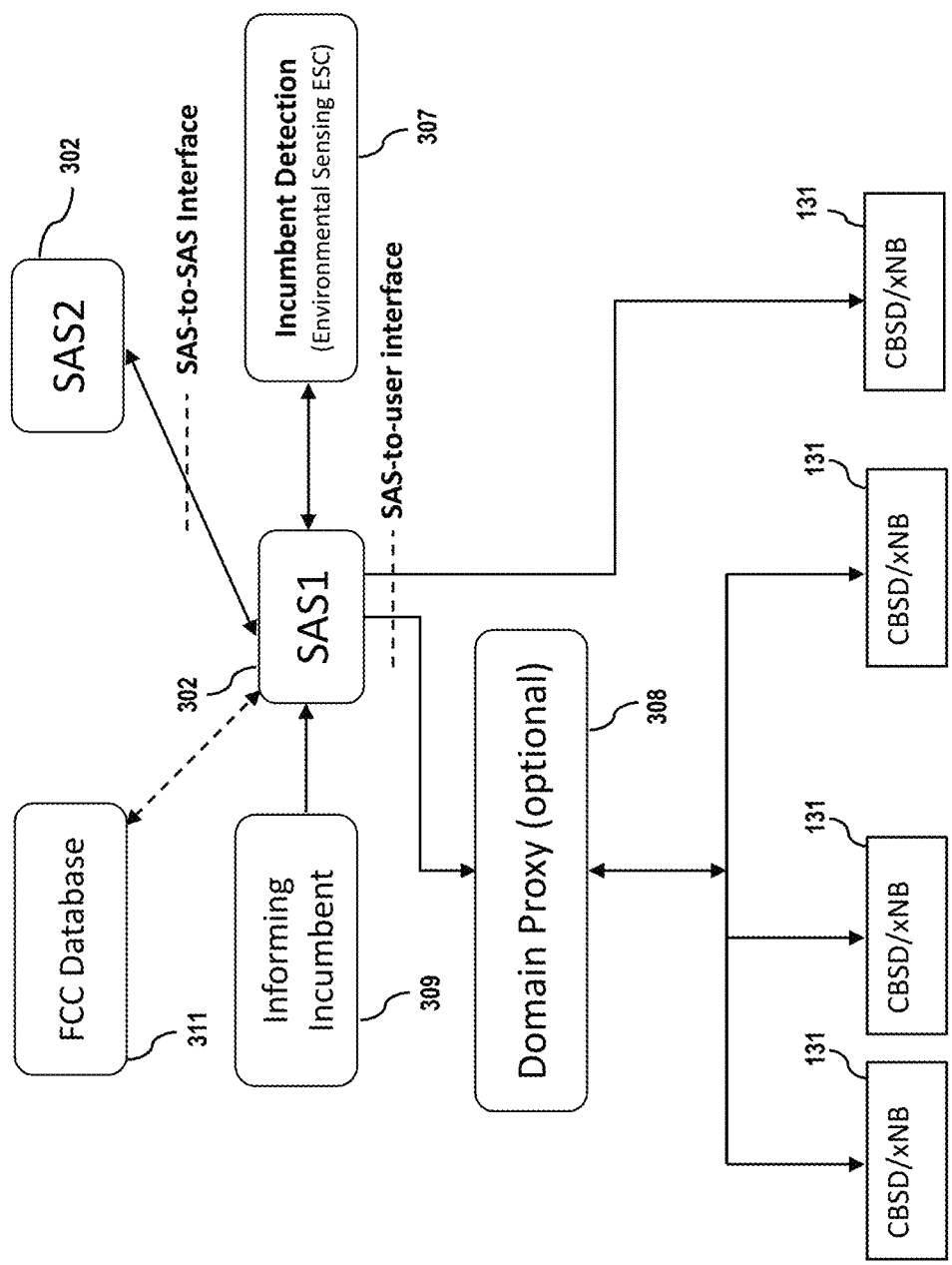
FIG. 3 is a functional block diagram illustrating a general architecture for the CBRS system of the prior art.
Figure 4:
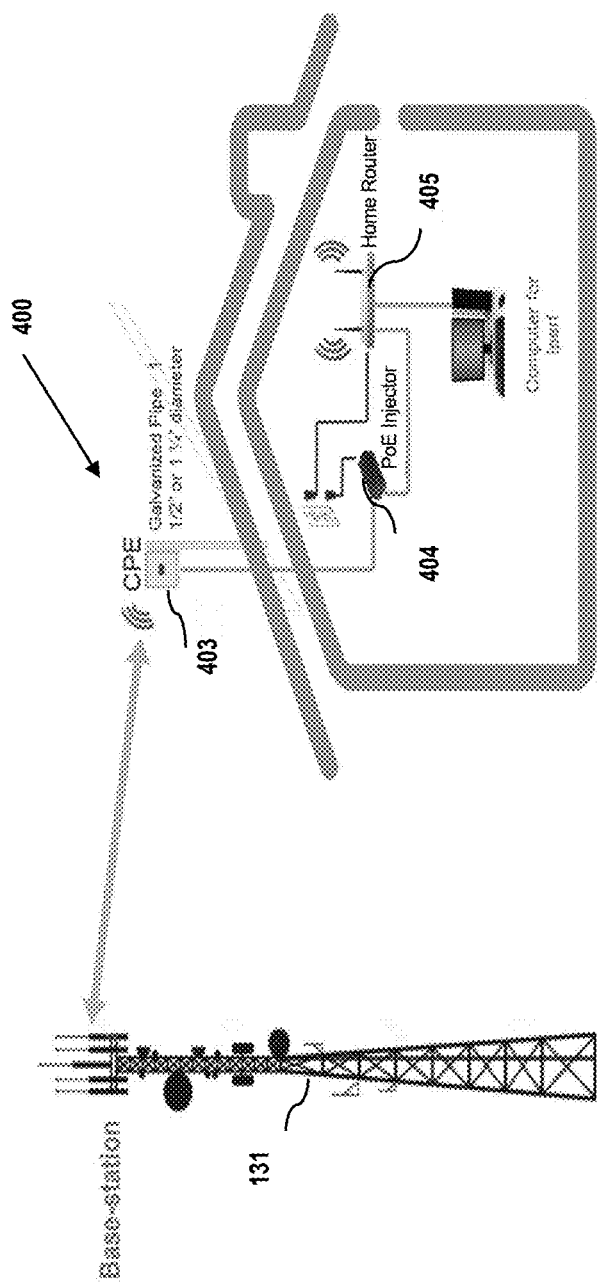
FIG. 4 is a graphical illustration of a prior art configuration for delivery of data from a base station to an end-user device (CPE/FWA) within the wireless coverage area of the base station.

Per step 1203, the CBSDe 702 registers with the SAS 302 (FIG. 3), and the SAS assigns the CBSDe necessary data such as an ID and spectrum grant, according to extant CBRS protocols.

Per step 1205, the CPEe 704 also registers with the SAS. In some scenarios where the CPEe needs to operate at signal levels higher than 23 dBm (e.g., Category A versus B), the CPEe can register with the SAS as a CBSD.

Per step 1207, the CPEe measures the RSRP of the relevant serving CBSDe 702 to estimate the received power associated with the CBSDe. It will be appreciated that this operation (as well as some subsequent steps of the method) may be performed by the CPEe pursuant to evaluating a given CBSDe for subsequent selection and operation. For instance, a given CPEe may have two or three "candidate" CBSDe devices within range, and depending on channel conditions specific to each, the CPEe logic may be configured to evaluate and determine the CBSDe with the highest RSRP value, and only pursue further negotiation and data transfer with that highest CBSDe.

Per step 1209, the CPEe/FWAe 704 calculates the SINR from the estimated CBSDe power, and maps the calculated SINR to a CQI a value through a pre-defined data structure such as a lookup table or an equation. The CQI value indicates the configuration (e.g., MCS) value at which the CPEe can decode the transport data block without any error (or with a prescribed maximum level of tolerable error), which depends on the DL physical channel and its capacity.

In some embodiments of the method, an effective SINRe is computed through a Mutual Information Effective SINR mapping (MIESM) from the instantaneous SINRs at the RSRP location. For instance, the SINRe may be calculated from the following equation:

$$SINRe = f^{-1}\left(\sum_{p=1}^{P} \frac{1}{P} f\left(\frac{SINRp}{\beta}\right)\right) \qquad \text{Eqn. (2)}$$

where P indicates the number of subcarriers in an OFDM symbol, and $\beta$ is a calibration factor. The function $f(\cdot)$ is the bit-interleaved coded modulation (BICM) capacity curve in this embodiment.

In some embodiments, Eqn. (1) may be calculated offline, and stored in the storage device of the relevant component (e.g., CPEe). In some scenarios, the CPEe 704 may use multiple antenna techniques such as spatial multiplexing or transmit diversity techniques for processing the received data including measuring the RSRP, channel estimation and data decoding.

The CPEe may use various receiver type or algorithms to estimate the SINR and decode the data. For instance, Minimum Mean Square Error (MMS), Maximum Likelihood (ML), and/or Maximum Posterior Probability (MAP) may be used consistent with the disclosure, although it will be appreciated by those of ordinary skill given this disclosure that other approaches may be used.

In addition, the CQI generation may correspond to (or be specific to) different Multiple-Input-Multiple-Output DL transmission modes. For instance, in some scenarios, CQI may be generated for closed-loop precoding, Spatial Frequency Block Coding (SFBC), open loop precoding, Multi-User MIMO (MU-MIMO), Cyclic Delay Diversity (CDD), etc. As such, depending on the mode, the CQI may be different.

Further, these scenarios consider different Doppler Frequency, and hence can be used for both slow and fast varying channels (including the presumed slower-varying channels of the exemplary stationary FWAe). Accordingly, these scenarios incorporate Doppler frequency in the CBSDe power estimation, and receiver algorithms to decode the data which leads to an accurate CQI generation under a variety of circumstances including those expected for FWAe installations.

Returning to FIG. 12, per step 1211, the CPEe transmits the determined CQI value(s) to the CBSDe via an UL channel. The CPEe may report the CQI values periodically at certain time (e.g., each time slot, frame), according to a schedule, in an event-driven manner, or otherwise. Moreover, as noted above, depending on mode, the CPEe may transmit multiple CQI values associated with different modes, whether simultaneously or at different times.

Per step 1213, once the CBSDe receives the CQI data from the CPEe, it maps the CQI value to a configuration such as an MCS value through a lookup table stored in the CBSDe storage device (or location otherwise accessible to the CBSDe, such as cloud storage). In some embodiment, the CBSDe may use a fixed CQI table, which is stored locally in CBSDe mass storage or memory. In other embodiments, the stored CQI table may varies for different scenarios, which can depend on channel propagation characteristics such as Doppler shift, antenna correlation, thermal noise variance, angle of arrival and etc.

Per step 1215, the CBSDe transmits data to the CPEe on the DL data channel(s) using the calculated configuration (e.g., MCS) value. In one variant, the Transport Block (TB) size is also decided based on the MCS value from a lookup table, e.g., as defined in 3GPP TS 36.213.

Figure 13:
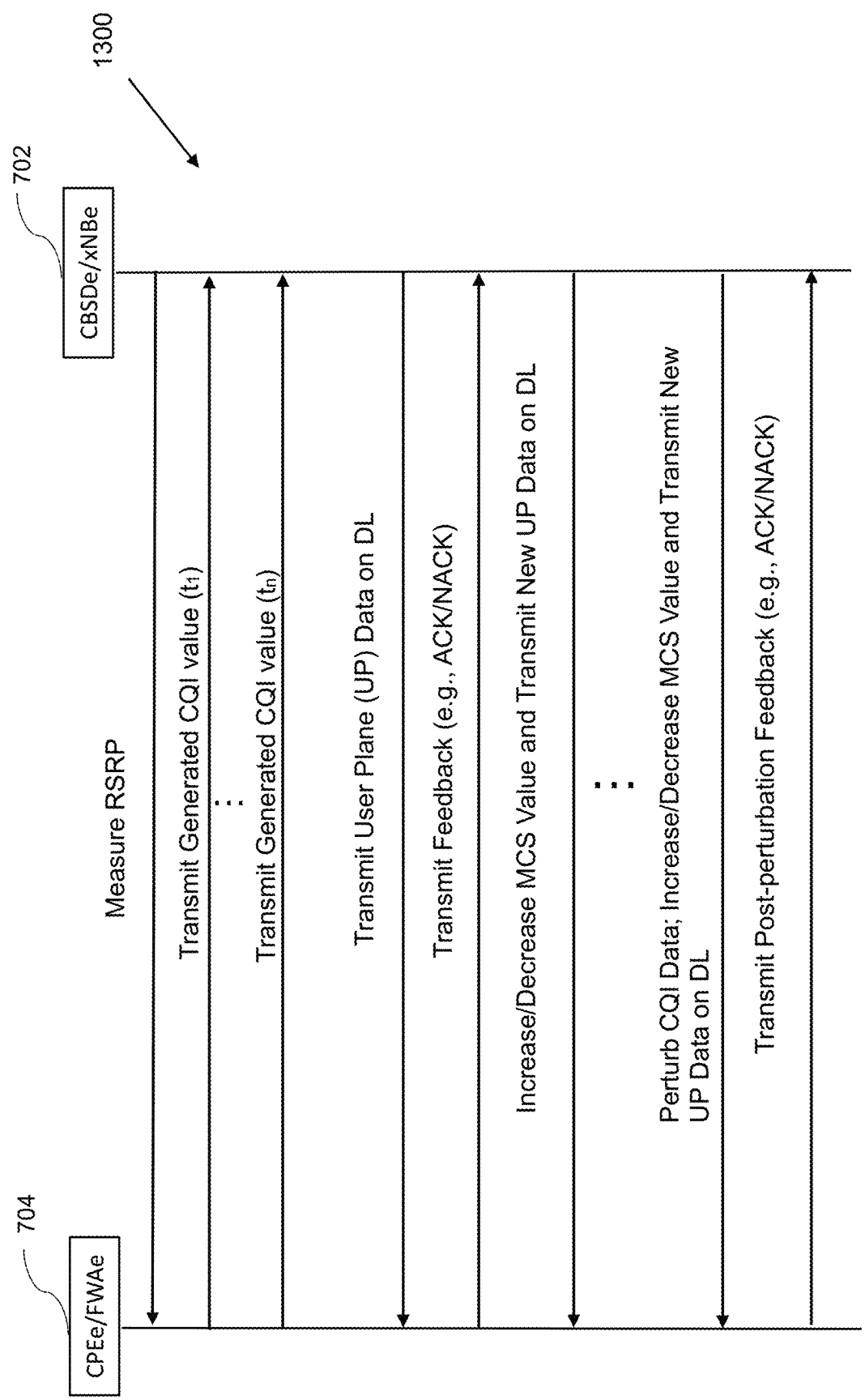
FIG. 13 is a ladder diagram illustrating communication and data flow between a serving CBSDe/xNBe and served FWAe, according to one embodiment of the present disclosure.

FIG. 13 is a ladder diagram illustrating one embodiment of the communication flow between CBSDe 702 and CPEe 704. Note that in the exemplary embodiment, one or more extant 3GPP control plane (CP) channels (including shared channels such as PUSCH or PDSCH) are used for passing data between the CPEe and CBSDe in the UL, although other mechanisms may be used as well.

Service Provider Network—

FIG. 14 illustrates one embodiment of a service provider network configuration useful with the adaptive CQI and "perturbation" functionality and supporting 3GPP/CBRS-based wireless network(s) described herein. It will be appreciated that while described with respect to such network configuration, the methods and apparatus described herein may readily be used with other network types and topologies, whether wired or wireless, managed or unmanaged.

The exemplary service provider network 1400 is used in the embodiment of FIG. 14 to provide backhaul and Internet access from the service provider's wireless access nodes (e.g., CBSDe/xNBe devices, Wi-Fi APs, FWAe devices or base stations operated or maintained by the MSO), and one or more stand-alone or embedded DOCSIS cable modems (CMs) 125 in data communication therewith.

The individual CBSDe/xNBe devices 702 are backhauled by the CMs 125 to the MSO core via 710 includes at least some of the EPC/5GC core functions previously described. Each of the CPEe/FWAe 704 are communicative with their respective CBSDe 702. Client devices 141 such as tablets, smartphones, SmartTVs, etc. at each premises are served by respective WLAN routers 706, the latter which are backhauled to the MSO core or backbone via their respective CPEe/FWAe 704.

Notably, in the embodiment of FIG. 14, all of the necessary components for support of the CPEe/FWAe and BSe functionality described above and within the MSO portion are owned, maintained and/or operated by the common entity (e.g., cable MSO). The approach of FIG. 14 has the advantage of, inter alia, giving the MSO control over the entire service provider chain, including control over the xNBe devices so as to optimize service to its specific customers (versus the non-MSO customer-specific service provided by an MNO, as discussed below), and the ability to construct its architecture to optimize incipient 5G NR functions such as network slicing, gNB DU/CU Option "splits", etc.

Notwithstanding, in the embodiment of FIG. 14, the architecture 1300 may further include an optional MNO portion (e.g., MNO core 1423 and associated CBSDe or xNBe devices 702, and/or non-enhanced CBSD/xNB devices, which may be operated by the MNO versus the MSO in support of e.g., fixed UE comparable to the CPEe/FWAe within the MSO network, including for subscribers of the MSO or otherwise. For example, other functions such as 3GPP EPC/E-UTRAN or 5GC and NG-RAN functionality can be provided by one or more MNO networks operated by MNOs with which the MSO has a service agreement (and between which data connectivity and network "federation" exists, as shown). This approach has the advantage of, inter alia, avoiding more CAPEX by the MSO, including duplication of infrastructure which may already service the area of interest, including reduced RF interference due to addition of extra (and ostensibly unnecessary) CBSDe/xNBe devices or other transceivers.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of data traffic management in a wireless network having a plurality of wireless premises devices in wireless communication with a base station, the computerized method comprising:

receiving, at the base station of the wireless network, first data related to respective ones of radio frequency (RF) channels between the base station and the plurality of wireless premises devices;

evaluating the received first data to generate respective characterizations of the respective ones of the RF channels;

based at least in part on the respective characterizations, adjusting a configuration of at least one of the plurality of wireless premises devices;

determining a schedule of data delivery to the at least one of the plurality of wireless premises devices, the determination based at least on the characterizations and the adjusted configuration; and performing, after the determining of the schedule, a channel quality indicator randomization process, the channel quality indicator randomization process comprising:
(i) generating data relating to a plurality of channel quality indicator values associated with a plurality of respective second wireless premises devices;
(ii) sending, to each one of the plurality of second wireless premises devices, data representative of a request to stop reporting channel quality indicator values associated with the each of the plurality of second wireless premises devices;
(iii) after a prescribed period of time has elapsed since the sending, selecting one or more of the plurality of wireless premises devices via a randomized process; and
(iv) increasing respective one or more of the plurality of channel quality indicator values associated with the one or more of the plurality of wireless premises devices by a prescribed amount in order to perturb the schedule.

2. The computerized method of claim 1, wherein the receiving of the first data comprises receiving channel quality indicators generated by respective ones of the plurality of wireless premises devices.

3. The computerized method of claim 1, wherein the evaluating the received first data to generate the respective characterizations comprises:
calculating a respective standard deviation of a plurality of channel quality indicator values received from each of the plurality of wireless premises devices over a period of time; and
evaluating at least the standard deviation associated with the at least one of the plurality of wireless premises devices against a prescribed channel stability criterion.

4. The computerized method of claim 3, wherein the determining of the schedule comprises increasing a priority level associated with the data delivery to the at least one of the plurality of wireless premises devices relative to other priority levels associated with data delivery to respective ones of other of the plurality of wireless premises devices.

5. The computerized method of claim 1, wherein the adjusting of the configuration comprises adjusting at least one of (i) a modulation and coding scheme value, or (ii) a transport block size related to the at least one of the plurality of wireless premises devices.

6. The computerized method of claim 5, wherein the adjusting the at least one of (i) the modulation and coding scheme value or (ii) the transport block size comprises:
increasing the modulation and coding scheme value by a first amount;
transmitting data to the at least one of the plurality of wireless premises devices using the increased modulation and coding scheme value;
determining that data representative of a retransmission request for the transmitted data is received from the at least one of the plurality of wireless premises devices; and
based at least on the determining that the data representative of the retransmission request is received, decreasing the modulation and coding scheme value by a second amount.

7. The computerized method of claim 5, wherein the adjusting the at least one of (i) the modulation and coding scheme value or (ii) the transport block size comprises:
increasing the modulation and coding scheme value by a first amount;
transmitting data to the at least one of the plurality of wireless premises devices using the increased modulation and coding scheme value;
determining that data representative of a retransmission request for the transmitted data is not received from the at least one of the plurality of wireless premises devices for a prescribed duration of time; and
based at least on the determining that the data representative of the retransmission request is not received for the prescribed duration of time, increasing the modulation and coding scheme value further.

8. The computerized method of claim 1, wherein:
the base station comprises a CBRS (Citizens Broadband Radio Service) CBSD (Citizens Broadband Service Device) compliant with 3GPP (Third Generation Partnership Project) protocols;
the respective ones of the RF channels each comprise channels using a CBRS frequency within the band of 3.550 to 3.700 GHz inclusive, the CBRS frequency assigned to the CBSD by a SAS (spectrum allocation system); and
the at least one of the plurality of wireless premises devices comprises a CBRS fixed wireless apparatus (FWA).

9. Computerized wireless network apparatus configured for data communication at least with a plurality of fixed wireless Customer Premises Equipment (CPE) via a content delivery network, the computerized wireless network apparatus comprising:
processor apparatus;
a wireless interface in data communication with the processor apparatus and configured for wireless data communication with the plurality of fixed wireless CPE; and
storage apparatus in data communication with the processor apparatus, the storage apparatus comprising at least one computer program configured to, when executed by the processor apparatus, cause the computerized wireless network apparatus to:
receive first data relating to a wireless channel between one of the plurality of fixed wireless CPE and the computerized wireless network apparatus;
process the received first data to determine a priority of the one of the plurality of fixed wireless CPE relative to at least one other of the plurality of fixed wireless CPE;
based at least on the processed first data, cause adjustment of a configuration of the wireless interface and a corresponding wireless interface of the one of the plurality of fixed wireless CPE;
based at least in part on the adjusted configuration, determine a schedule of data delivery to at least the one of the plurality of fixed wireless CPE;
receive feedback data from the one of the plurality of fixed wireless CPE; and
based on the feedback data, transmit instruction data to the one of the plurality of fixed wireless CPE, the instruction data configured to instruct the one of the plurality of fixed wireless CPE to suspend further transmission of data indicative of a quality of the wireless channel until a subsequent occurrence of an event, the event comprising a subsequent change in at least one of a modulation and coding scheme (MCS) or transport block size (TBS) associated with transmission of user plane (UP) data from the computerized wireless network apparatus to the one of the plurality of fixed wireless CPE via use of the wireless channel.

10. The computerized wireless network apparatus of claim 9, wherein:
the receipt of the first data relating to the wireless channel between the one of the plurality of fixed wireless CPE and the computerized wireless network apparatus comprises receipt of a plurality of 3GPP (Third Generation Partnership Project) CQI (channel quality indicator) data over a prescribed period of time; and
the processing of the received first data to determine the priority comprises: (i) generation of a statistical distribution using at least the plurality of 3GPP CQI data; and (ii) generation of a representative CQI value based on the statistical distribution.

11. The computerized wireless network apparatus of claim 10, wherein:
the generation of the representative CQI value based on the statistical distribution comprises determination of at least one of a mean or median value for the statistical distribution; and
the adjustment of the configuration of the wireless interface and the corresponding wireless interface of the one of the plurality of fixed wireless CPE is based at least on the mean or median value.

12. The computerized wireless network apparatus of claim 9, wherein the at least one computer program is further configured to, when executed by the processor apparatus, cause the computerized wireless network apparatus to:
utilize the feedback data in a second adjustment of the configuration of the wireless interface and the corresponding wireless interface of the one of the plurality of fixed wireless CPE.

13. The computerized wireless network apparatus of claim 12, wherein the feedback data relates to a sufficiency of a data transmission and comprising data relating to a need for retransmission of the feedback data due to a decoding failure by the one of the plurality of fixed wireless CPE.

14. The computerized wireless network apparatus of claim 9, wherein the at least one computer program is further configured to, when executed by the processor apparatus:
determine that the wireless channel is substantially invariate over a prescribed period of time.

15. The computerized wireless network apparatus of claim 9, wherein the determination of the schedule of the data delivery comprises causation of an increase in a priority level associated with the data delivery to the one of the plurality of fixed wireless CPE relative to other priority levels associated with data delivery to respective other ones of the plurality of fixed wireless CPE.

16. Computer readable apparatus comprising a non-transitory storage medium, the non-transitory storage medium comprising at least one computer program having a plurality of instructions, the plurality of instructions configured to, when executed on a processing apparatus of a base station apparatus of a wireless network, cause the base station apparatus to:

receive first data related to respective ones of radio frequency (RF) channels between the base station apparatus and a plurality of fixed wireless apparatus;
evaluate the received first data to generate respective characterizations of the respective ones of the RF channels;
based at least in part on the respective characterizations, cause adjustment of a configuration of one or more of the plurality of fixed wireless apparatus; and
determine a schedule of data delivery to the one or more of the plurality of fixed wireless apparatus, the determination based at least on the characterizations and the adjusted configuration;
receive feedback data from the one or more of the plurality of fixed wireless apparatus; and
based on the feedback data, transmit instruction data to the one or more of the plurality of fixed wireless apparatus, the instruction data configured to instruct the one or more of the plurality of fixed wireless apparatus to suspend further transmission of data indicative of a quality of a channel until a subsequent occurrence of an event, the event comprising a subsequent change in at least one of a modulation and coding scheme (MCS) or transport block size (TBS) associated with transmission of user plane (UP) data from the base station apparatus to the one or more of the plurality of fixed wireless apparatus via use of the channel.

17. The computer readable apparatus of claim 16, wherein the receipt of the feedback data comprises receipt of the feedback data after the subsequent change in the at least one of the MCS or TBS.

18. The computer readable apparatus of claim 16, wherein:
the base station apparatus comprises a CBRS (Citizens Broadband Radio Service) CBSD (Citizens Broadband Service Device) compliant with 3GPP (Third Generation Partnership Project) protocols;
the UP data is received using a CBRS frequency within the band of 3.550 to 3.700 GHz inclusive, the CBRS frequency assigned to the CBSD by a SAS (spectrum allocation system);
the one or more of the plurality of fixed wireless apparatus comprises a CBRS fixed wireless apparatus (FWA) disposed at a user premises; and
the base station apparatus and the one or more of the plurality of fixed wireless apparatus are each managed by a common network operator serving the user premises.

19. The computer readable apparatus of claim 16, wherein the channel is substantially invariate over a prescribed period of time.

20. The computer readable apparatus of claim 16, wherein the determination of the schedule of the data delivery comprises causation of an increase in a priority level associated with the data delivery to the one or more of the plurality of fixed wireless apparatus relative to other priority levels associated with data delivery to respective other ones of the plurality of fixed wireless apparatus.

* * * * *